United States Patent
Mishima et al.

(10) Patent No.: US 7,143,426 B2
(45) Date of Patent: Nov. 28, 2006

(54) MULTILAYER OPTICAL RECORDING MEDIUM WITH THICKNESS RANGES REDUCING INTERLAYER CROSS-TALK

(75) Inventors: Koji Mishima, Tokyo (JP); Hajime Utsunomiya, Tokyo (JP); Hiroyasu Inoue, Tokyo (JP); Tsuyoshi Komaki, Tokyo (JP); Takashi Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 385 days.

(21) Appl. No.: 10/744,382

(22) Filed: Dec. 23, 2003

(65) Prior Publication Data

US 2004/0139459 A1 Jul. 15, 2004

(30) Foreign Application Priority Data

Dec. 27, 2002 (JP) ............................. 2002-378977

(51) Int. Cl.
G11B 7/24 (2006.01)

(52) U.S. Cl. ...................................... 720/718

(58) Field of Classification Search ................ 720/718, 720/719
See application file for complete search history.

(56) References Cited

U.S. PATENT DOCUMENTS 5,875,169 A * 2/1999 Hatwar ........................ 720/718

FOREIGN PATENT DOCUMENTS

| DE | 3741910 A1 * | 6/1988 |
| JP | 3-49054 A * | 3/1991 |
| JP | 2001-155380 | 6/2001 |
| JP | 2003-013201 | 1/2003 |

* cited by examiner

Primary Examiner—Julie Anne Watko
(74) Attorney, Agent, or Firm—Seed IP Law Group PLLC

(57) ABSTRACT

An optical recording medium includes a substrate, a protective layer, three or more information recording layers formed between the substrate and the protective layer and transparent intermediate layers each formed between neighboring information recording layers and capable of recording data in the three or more information recording layers and reproducing data recorded in the three or more information recording layers by projecting a laser beam onto the three or more information recording layers via a light incidence plane constituted by the surface of either the substrate or the protective layer, wherein neighboring transparent intermediate layers facing each other across an information recording layer have different thicknesses. According to the thus constituted optical recording medium, it is possible to reduce interlayer cross-talk.

4 Claims, 12 Drawing Sheets

MULTILAYER OPTICAL RECORDING MEDIUM WITH THICKNESS RANGES REDUCING INTERLAYER CROSS-TALK

BACKGROUND OF THE INVENTION

The present invention relates to an optical recording medium, and particularly, to an optical recording medium which includes three or more information recording layers and reduces interlayer cross-talk.

DESCRIPTION OF THE PRIOR ART

Optical recording media such as the CD, DVD and the like have been widely used as recording media for recording digital data. Such optical recording media require improvement in ability to record large amounts of data and various proposals have been made in order to increase the data recording capacity thereof.

One of these is an optical recording medium having two information recording layers and such an optical recording medium has been already put to the practical use as an optical recording medium adapted to enable only data reading, such as the DVD-Video and the DVD-ROM.

An optical recording medium adapted only for reading data and provided with two information recording layers is formed by laminating two substrates each having prepits constituting a information recording layer on the surface thereof via a transparent intermediate layer.

Therefore, an optical recording medium having three or more information recording layers and capable of recording large amounts of data can be obtained by laminating three or more substrates formed with surface prepits and constituting information recording layers alternately with transparent intermediate layers.

However, in an optical recording medium including three or more information recording layers, when a laser beam is focused onto a certain information recording layer to reproduce data recorded therein, cross-talk caused by the laser beam projected onto the other information recording layers (hereinafter referred to as "interlayer cross-talk") increases in comparison with that in an optical recording medium including only two information recording layers.

This interlayer cross-talk can be reduced to some extent by increasing the thickness of the transparent intermediate layers between neighboring information recording layers.

However, it is not feasible to increase the thickness of an optical recording medium owing to the need to ensure compatibility with optical recording medium already in practical use and it is therefore impossible to sufficiently increase the thickness of the transparent intermediate layers between neighboring information recording layers. As a result, in an optical recording medium including three or more information recording layers, interlayer cross talk inevitably increases as the number of information recording layers increases.

SUMMARY OF THE INVENTION

It is therefore an object of the present invention to provide an optical recording medium which includes three or more information recording layers and reduces interlayer cross-talk.

The above and other objects of the present invention can be accomplished by an optical recording medium comprising a substrate, a protective layer, three or more information recording layers formed between the substrate and the protective layer and transparent intermediate layers each formed between neighboring information recording layers and capable of recording data in the three or more information recording layers and reproducing data recorded in the three or more information recording layers by projecting a laser beam onto the three or more information recording layers via a light incidence plane constituted by the surface of either the substrate or the protective layer, wherein neighboring transparent intermediate layers facing each other across an information recording layer have different thicknesses.

According to the present invention, neighboring transparent intermediate layers facing each other across an information recording layer have different thicknesses, so that when a laser beam is projected onto the information recording layer farther from the light incidence plane among the neighboring information recording layers to reproduce data therefrom, the laser beam reflected from the information recording layer located on the side of the light incidence plane with respect to the information recording layer onto which the laser beam is focused is not focused onto any other information recording layer and, therefore, it is possible to effectively prevent generation in the reproduced signal of significant interlayer cross-talk owing to the laser beam focused onto the information recording layer from which data are to be reproduced being projected onto other information recording layers.

In a preferred aspect of the present invention, the optical recording medium comprises a first information recording layer farthest from the light incidence plane, a second information recording layer located on the side of the light incidence plane with respect to the first information recording layer, a third information recording layer closest to the light incidence plane, a first transparent intermediate layer formed between the first information recording layer and the second information recording layer, and a second transparent intermediate layer formed between the second information recording layer and the third information recording layer, and the first transparent intermediate layer and the second transparent intermediate layer are formed so that the thickness of the first transparent intermediate layer is larger than that of the second transparent intermediate layer.

In a further preferred aspect of the present invention, the first transparent intermediate layer and the second transparent intermediate layer are formed so that $(Db-Da)/Da \geq 0.05$ and $Da<Db$ are satisfied where Da is the thickness of the first transparent intermediate layer and Db is the thickness of the second transparent intermediate layer.

In another preferred aspect of the present invention, the optical recording medium comprises a first information recording layer farthest from the light incidence plane, a second information recording layer located on the side of the light incidence plane with respect to the first information recording layer, a third information recording layer located on the side of the light incidence plane with respect to the second information recording layer, a fourth information recording layer closest to the light incidence plane, a first transparent intermediate layer formed between the first information recording layer and the second information recording layer, a second transparent intermediate layer formed between the second information recording layer and the third information recording layer, and a third transparent intermediate layer formed between the third information recording layer and the fourth information recording layer, and the first transparent intermediate layer, the second transparent intermediate layer and the third transparent intermediate layer are formed so that the thickness of the second transparent intermediate layer is larger than that of the first transparent intermediate layer and that of the third transparent intermediate layer.

In a further preferred aspect of the present invention, the first transparent intermediate layer, the second transparent intermediate layer and the third transparent intermediate layer are formed so that the thickness of the first transparent intermediate layer is larger than that of the third transparent intermediate layer.

In a further preferred aspect of the present invention, the first transparent intermediate layer, the second transparent intermediate layer and the third transparent intermediate layer are formed so that the thickness of the first transparent intermediate layer is 20% to 40% of the total thickness of the first transparent intermediate layer, the second transparent intermediate layer and the third transparent intermediate layer, the thickness of the second transparent intermediate layer is 35% to 60% of the total thickness of the first transparent intermediate layer, the second transparent intermediate layer and the third transparent intermediate layer, and the thickness of the third transparent intermediate layer is 20% to 40% of the total thickness of the first transparent intermediate layer, the second transparent intermediate layer and the third transparent intermediate layer.

In a further preferred aspect of the present invention, the first transparent intermediate layer, the second transparent intermediate layer and the third transparent intermediate layer are formed so that the thickness of the first transparent intermediate layer is 22% to 36% of the total thickness of the first transparent intermediate layer, the second transparent intermediate layer and the third transparent intermediate layer, the thickness of the second transparent intermediate layer is 36% to 55% of the total thickness of the first transparent intermediate layer, the second transparent intermediate layer and the third transparent intermediate layer, and the thickness of the third transparent intermediate layer is 22% to 32% of the total thickness of the first transparent intermediate layer, the second transparent intermediate layer and the third transparent intermediate layer.

The above and other objects and features of the present invention will become apparent from the following description made with reference to the accompanying drawings.

DESCRIPTION OF THE PREFERRED EMBODIMENTS

Figure 1:
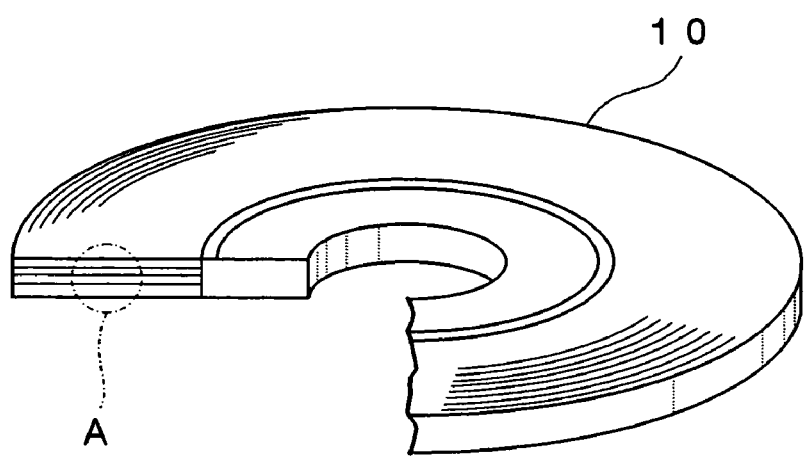
FIG. 1 is a schematic perspective view showing an optical recording medium that is a preferred embodiment of the present invention.
Figure 2:
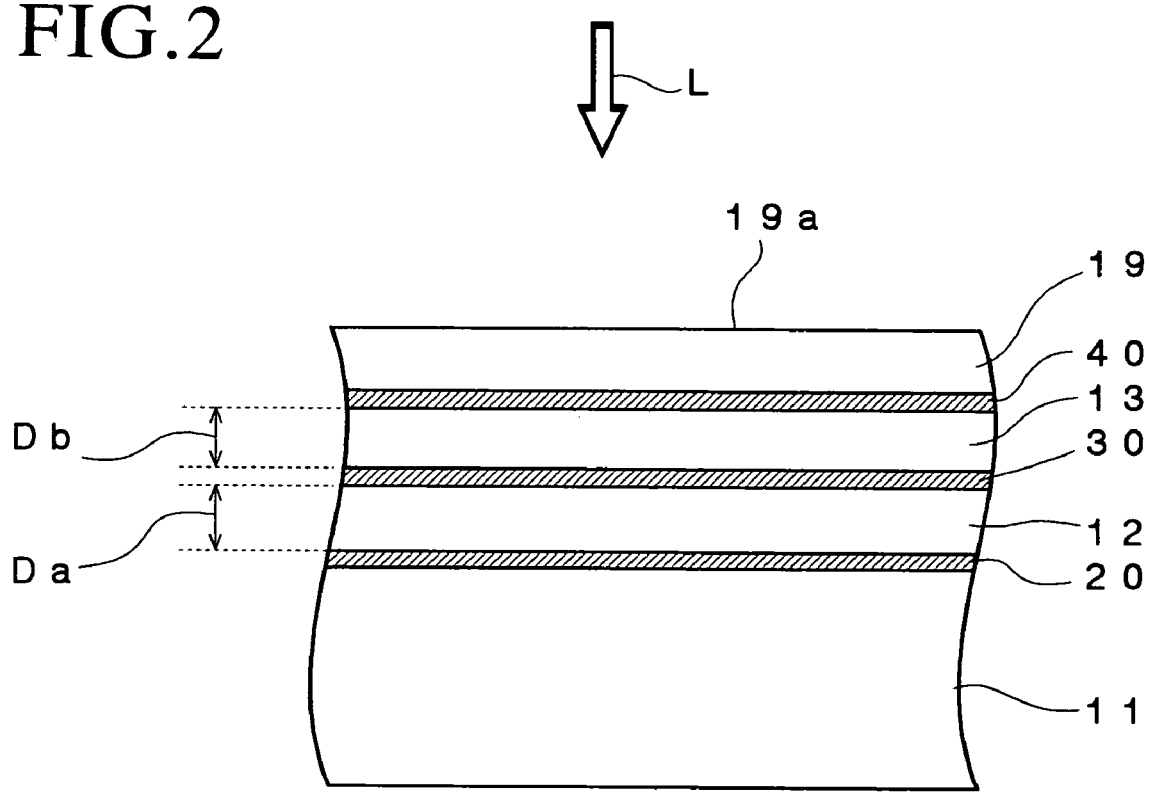
FIG. 2 is an enlarged schematic cross-sectional view of the part of the optical recording medium indicated by A in FIG. 1.

FIG. 1 is a schematic perspective view showing an optical recording medium that is a preferred embodiment of the present invention and FIG. 2 is a schematic enlarged cross-sectional view indicated by A in FIG. 1.

As shown in FIG. 1, an optical recording medium 10 according to this embodiment is formed disk-like and has a outer diameter of about 120 mm and a thickness of about 1.2 mm.

As shown in FIG. 2, the optical recording medium 10 according to this embodiment includes a support substrate 11, a first transparent intermediate layer 12, a second transparent intermediate layer 13, a light transmission layer (protective layer) 19, an L0 layer 20 formed between the support substrate 11 and the first transparent intermediate layer 12, an L1 layer 30 formed between the first transparent layer 12 and the second transparent intermediate layer 13 and an L2 layer 40 formed between the second transparent layer 13 and the light transmission layer 19.

The L0 layer 20, the L1 layer 30 and the L2 layer 40 are information recording layers in which data are recorded, i.e., the optical recording medium 10 according to this embodiment includes three information recording layers.

The L0 layer 20, the L1 layer 30 and the L2 layer 40 are formed in this order from the side of the support substrate 11 so that the L0 layer 20 constitutes a farthest information recording layer from a light incidence plane 19a and the L2 layer 40 constitutes a closest information recording layer to the light incidence plane 19a.

Therefore, when data are to be recorded in the L0 layer 20 or data recorded in the L0 layer 20 are to be reproduced, a laser beam L is projected onto the L0 layer 20 via the L1 layer 30 and the L2 layer 40 and when data are to be recorded in the L1 layer 30 or data recorded in the L1 layer 30 are to be reproduced, the laser beam L is projected onto the L1 layer 30 via the L2 layer 40.

The support substrate 11 serves as a support for ensuring mechanical strength and a thickness of about 1.2 mm required for the optical recording medium 10.

The material used to form the support substrate 11 is not particularly limited insofar as the support substrate 11 can serve as the support of the optical recording medium 10. The support substrate 11 can be formed of glass, ceramic, resin or the like. Among these, resin is preferably used for forming the support substrate 11 since resin can be easily shaped. Illustrative examples of resins suitable for forming the support substrate 11 include polycarbonate resin, polyolefin resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin and polyolefin resin are most preferably used for forming the support substrate 11 from the viewpoint of easy processing, optical characteristics and the like and in this embodiment, the support substrate 11 is formed of polycarbonate resin. In this embodiment, since the laser beam L is projected via the light incident plane 19a located opposite to the support substrate 11, it is unnecessary for the support substrate 11 to have a light transmittance property.

Although not shown in FIG. 2, grooves (not shown) and lands (not shown) are alternately and spirally formed on the surface of the support substrate 11 so as to extend from a portion in the vicinity of the center of the support substrate 11 toward the outer circumference thereof.

The first transparent intermediate layer 12 serves to space the L0 layer 20 and the L1 layer 30 apart by a physically and optically sufficient distance and grooves (not shown) and lands (not shown) are alternately and spirally formed on the surface thereof so as to extend from a portion in the vicinity of the center of the first transparent intermediate layer 12 toward the outer circumference thereof.

On the other hand, the second transparent intermediate layer 13 serves to space the L1 layer 30 and the L2 layer 40 apart by a physically and optically sufficient distance and grooves (not shown) and lands (not shown) are alternately and spirally formed on the surface thereof so as to extend from a portion in the vicinity of the center of the second transparent intermediate layer 13 toward the outer circumference thereof.

It is necessary for the first transparent intermediate layer 12 to have sufficiently high light transmittance since the laser beam L passes through the first transparent intermediate layer 12 when data are to be recorded in the L0 layer 20 and data recorded in the L0 layer 20 are to be reproduced and it is necessary for second transparent intermediate layer 13 to have sufficiently high light transmittance since the laser beam L passes through the second transparent intermediate layer 13 when data are to be recorded in the L0 layer 20 or the L1 layer 30 and data recorded in the L0 layer 20 or the L1 layer 30 are to be reproduced.

The material for forming each of the first transparent intermediate layer 12 and the second transparent intermediate layer 13 is not particularly limited insofar as it has sufficiently high light transmittance but an ultraviolet ray curable acrylic resin is preferably used for forming each of the first transparent intermediate layer 12 and the second transparent intermediate layer 13.

The thickness of each of the first transparent intermediate layer 12 and the second transparent intermediate layer 13 will be explained later.

The light transmission layer 19 serves to transmit the laser beam L and the light incident plane 19a is constituted by one of the surfaces thereof.

It is preferable to form the light transmission layer 19 so as to have a thickness of 30 µm to 200 µm.

The material for forming the light transmission layer 19 is not particularly limited insofar as it has sufficiently high light transmittance and, similarly to the first transparent intermediate layer 12 and the second transparent intermediate layer 13, an ultraviolet ray curable acrylic resin is preferably used for forming the light transmission layer 19.

The L0 layer 20, the L1 layer 30 and the L2 layer 40 may be formed as write-once type information recording layers that enable writing but not rewriting of data or data rewritable information recording layers but are constituted as write-once information recording layers in this embodiment.

Since the laser beam L passes through the L1 layer 30 and the L2 layer 40 when data are recorded in the L0 layer 20 or data are reproduced from the L0 layer 20, it is required for each of the L1 layer 30 and the L2 layer 40 to have a high light transmittance and for the difference in reflective coefficients between regions where record marks are formed and blank regions where no record mark is formed in the L1 layer and the L2 layer 40 to be sufficiently large.

For these purposes, it is preferable for at least the L1 layer 30 and the L2 layer 40 to contain the mixture of ZnS and $SiO_2$ or the mixture of $La_2O_3$, $SiO_2$ and $Si_3N_4$ as a primary component and be added with Mg or Al.

On the other hand, although not shown in FIG. 2, the L0 layer 20 includes a first L0 recording film located on the side of the support substrate 11 and a second L0 recording film located on the side of the light incidence plane 19a. The first L0 recording film contains Cu as a primary component and the second recording film contains Si as a primary component.

When the laser beam L for recording data is focused onto the thus constituted L0 layer 20, Cu contained in the first L0 recording film as a primary component and Si contained in the second recording film as a primary component are mixed to form a record mark.

In the case where data recorded in the thus constituted optical recording medium 10 are to be reproduced, a laser beam L is projected onto the optical recording medium 10 from the side of the light incidence plane 19a and the focus of the laser beam L is adjusted onto the one of the L0 layer 20, the L1 layer 30 or the L2 layer 40 in which the data to be reproduced are recorded.

Figure 3:
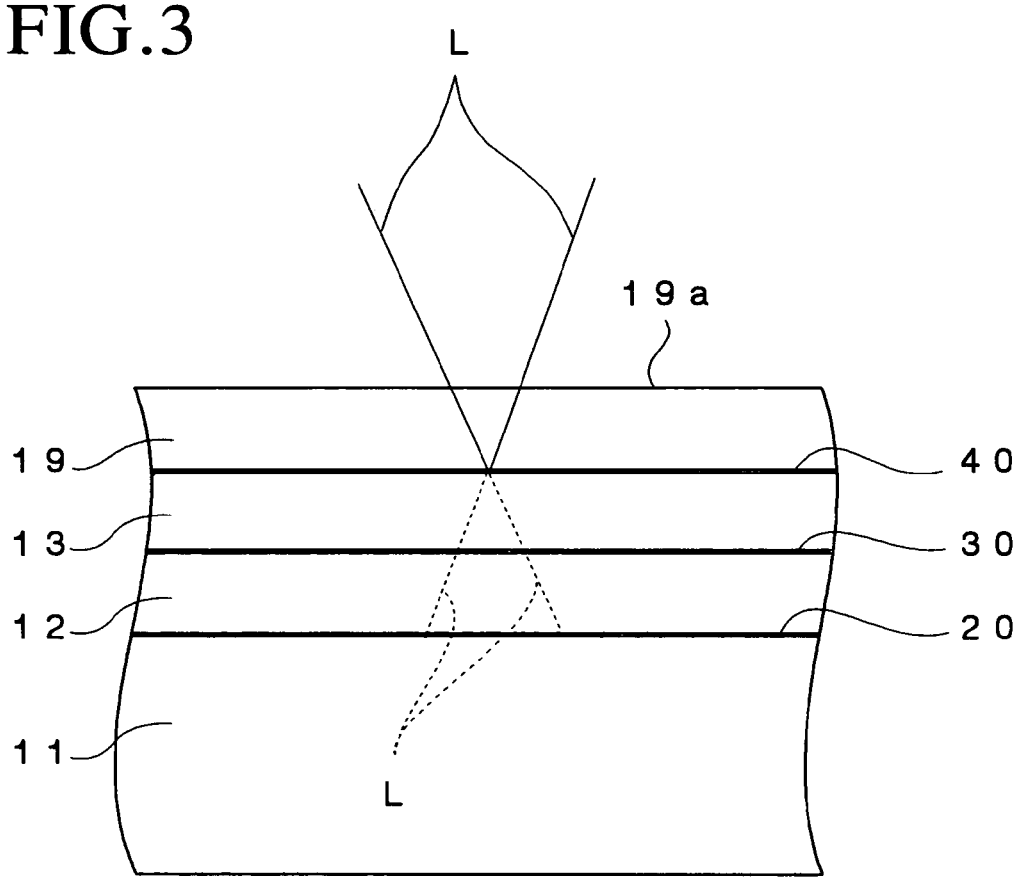
FIG. 3 is a schematic cross-sectional view showing the optical path of a laser beam when data recorded in an L2 layer of an optical recording medium are to be reproduced in the case where the thickness of a first transparent intermediate layer is substantially the same as that of a second transparent intermediate layer.

FIG. 3 is a schematic cross-sectional view showing the optical path of the laser beam L when data recorded in the L2 layer 40 of the optical recording medium 10 are to be reproduced in the case where the thickness of the first transparent intermediate layer 12 is substantially the same as that of the second transparent intermediate layer 13.

As shown in FIG. 3, in the case where data recorded in the L2 layer 40 of the optical recording medium 10 are to be reproduced, the laser beam L is focused onto the L2 layer 40.

The amount of the laser beam L reflected by the L2 layer 40 depends on the reflective coefficient of the L2 layer 40 within the spot of the laser beam L, namely, on whether or not a record mark is formed within the spot of the laser beam L and it is possible to reproduce data recorded in the L2 layer 40 of the optical recording medium 10 by detecting the amount of the laser beam L reflected by the L2 layer 40.

When the laser beam L is focused onto the L2 layer 40, spots of the laser beam L are formed in the L0 layer 20 and the L1 layer 30. Therefore, when data recorded in the L2 layer 40 are to be reproduced, the amount of the laser beam L reflected from the optical recording medium 10 and detected also includes the laser beam L components reflected by the L0 layer 20 and the L1 layer 30. Because of this, the distribution of the laser beam L reflected from the L0 layer 20 and the L1 layer 30 within the spots formed therein influences the amount the laser beam L component reflected by the optical recording medium 10 and detected, and a signal obtained by reproducing data recorded in the L2 layer 40 is influenced by data recorded in the L0 layer 20 and the L1 layer 30 to generate interlayer cross-talk.

The interlayer cross-talk which arises because the laser beam L focused onto an information recording layer for reproducing data stored therein is projected onto other information recording layers than the reproduced information recording layer and which gets mixed into the signal reproduced from the information recording layer increases as the spot area of the laser beam L formed in the information recording layers other than the reproduced information recording layer is less significant. The interlayer cross-talk which arises because the laser beam L focused onto the L2 layer 40 for reproducing data stored therein is projected onto the L1 layer 30 next to the L1 layer 40 and which gets mixed into the signal reproduced from the L2 layer 40 is therefore relatively signficant but the interlayer cross-talk which arises because the laser beam L focused onto the L2 layer 40 for reproducing data stored therein is projected onto the L0 layer and which gets mixed into the signal reproduced from the L2 layer 40 is insignificant.

Figure 4:
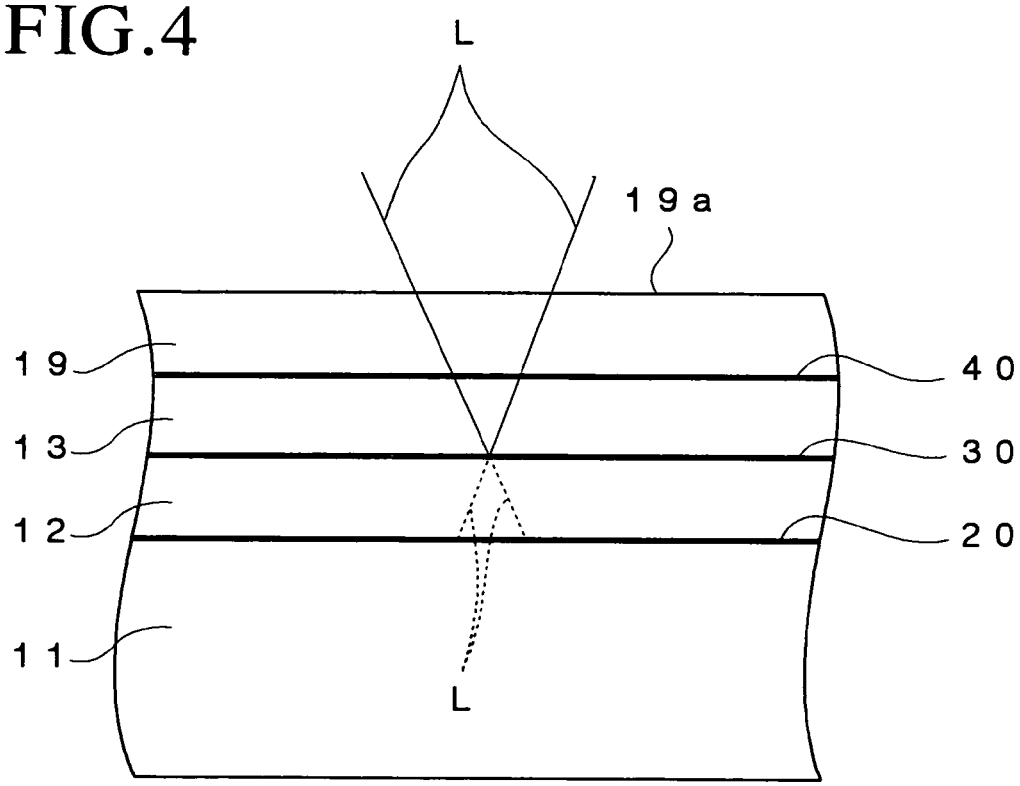
FIG. 4 is a schematic cross-sectional view showing the optical path of a laser beam when data recorded in an L1 layer of an optical recording medium are to be reproduced in the case where the thickness of a first transparent intermediate layer is substantially the same as that of a second transparent intermediate layer.

FIG. 4 is a schematic cross-sectional view showing the optical path of the laser beam L when data recorded in the L1 layer 30 of the optical recording medium 10 are to be reproduced in the case where the thickness of the first transparent intermediate layer 12 is substantially the same as that of the second transparent intermediate layer 13.

As shown in FIG. 4, in the case where data recorded in the L1 layer 30 of the optical recording medium 10 are to be reproduced, the laser beam L is focused onto the L1 layer 30 and the amount of the laser beam L reflected by the optical recording medium 10 is detected.

When the laser beam L is focused onto the L1 layer 30, spots of the laser beam L are formed in the L0 layer 20 and the L2 layer 40. Therefore, when data recorded in the L1 layer 30 are to be reproduced by detecting the amount of the laser beam L reflected by the optical recording medium 10, the laser beam L components reflected by the L0 layer 20 and the L2 layer 40 are simultaneously detected. Because of this, the reflective coefficient distribution of the L0 layer 20 and the L2 layer 40 within the spots formed therein influences the amount the laser beam L reflected by the optical recording medium 10 and detected, and a signal obtained by reproducing data recorded in the L1 layer 30 is influenced by the laser beam L components reflected by the L0 layer 20 and the L2 layer 40 to generate interlayer cross-talk.

Since the L0 layer 20 and the L2 layer 40 are located next to the L1 layer 30, the interlayer cross-talk which arises because the laser beam L focused onto the L1 layer 30 for reproducing data recorded therein is projected onto the L0 layer 20 and which gets mixed into the signal reproduced from the L1 layer 30 and the interlayer cross-talk which arises because the laser beam L focused onto the L1 layer 30 for reproducing data recorded therein is projected onto the L2 layer 40 and which gets mixed into the signal reproduced from the L1 layer 30 are both relatively substantial.

Figure 5:
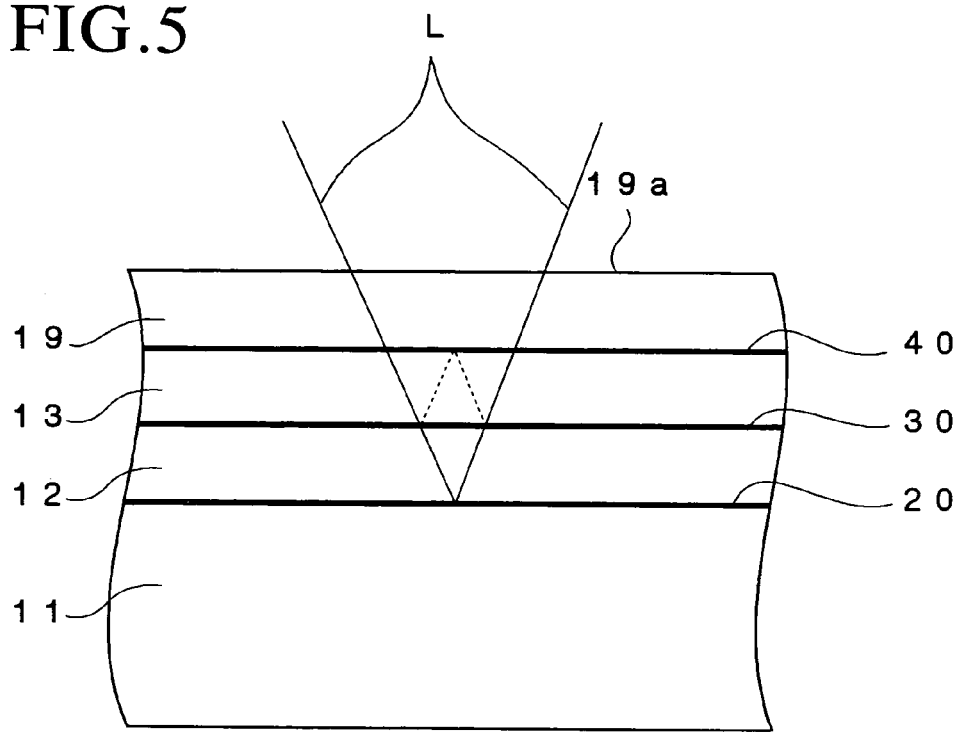
FIG. 5 is a schematic cross-sectional view showing the optical path of a laser beam when data recorded in an L0 layer of an optical recording medium are to be reproduced in the case where the thickness of a first transparent intermediate layer is substantially the same as that of a second transparent intermediate layer.

FIG. 5 is a schematic cross-sectional view showing the optical path of the laser beam L when data recorded in the L0 layer 20 of the optical recording medium 10 are to be reproduced in the case where the thickness of the first transparent intermediate layer 12 is substantially the same as that of the second transparent intermediate layer 13.

As shown in FIG. 5, in the case where data recorded in the L0 layer 20 of the optical recording medium 10 are to be reproduced, the laser beam L is focused onto the L0 layer 20 and the amount of the laser beam L reflected by the optical recording medium 10 is detected.

When the laser beam L is focused onto the L0 layer 20, spots of the laser beam L are formed in the L1 layer 30 and the L2 layer 40. Therefore, when data recorded in the L0 layer 20 are to be reproduced by detecting the amount of the laser beam L reflected by the optical recording medium 10, the laser beam L components reflected by the L1 layer 30 and the L2 layer 40 are simultaneously detected. Therefore, the reflective coefficient distribution of the L1 layer 30 and the L2 layer 40 within the spots formed therein influences the amount the laser beam L reflected by the optical recording medium 10 and detected, and a signal obtained by reproducing data recorded in the L0 layer 20 is influenced by the laser beam L components reflected by the L1 layer 30 and the L2 layer 40 to generate interlayer cross-talk.

As shown in FIG. 5, in the case where the thickness of the first transparent intermediate layer 12 is substantially the same as that of the second transparent intermediate layer 13, when the laser beam L is focused onto the L0 layer 20, the laser beam L component reflected by the L1 layer 30 is focused onto the L2 layer 40 or a portion in the vicinity of the L2 layer 40 and the area of the spot that the laser beam L component reflected by the L1 layer 30 forms in the L0 layer 40 or a portion in the vicinity thereof is extremely small. Therefore, interlayer cross-talk which arises because the laser beam L focused onto the L0 layer 20 for reproducing data recorded therein is projected onto the L2 layer 40 and which gets mixed into the signal reproduced from the L0 layer 20 is more significant than the interlayer cross-talk which arises because the laser beam L focused onto the L0 layer 20 for reproducing data recorded therein is projected onto the L1 layer 30 next to the L0 layer 20 and which gets mixed into the signal reproduced from the L0 layer 20.

Therefore, in the case where the thickness of the first transparent intermediate layer 12 is substantially the same as that of the second transparent intermediate layer 13, the influence of interlayer cross-talk is most significant when data recorded in the L0 layer 20 are reproduced and the influence of interlayer cross-talk is next most significant when data recorded in the L1 layer 30 are reproduced.

As described above, since the laser beam L component reflected by the L1 layer 30 is focused onto the L2 layer 40 or a portion in the vicinity of the L2 layer 40 and the area of the spot that the laser beam L component reflected by the L1 layer 30 forms in the L0 layer 40 becomes extremely small, the interlayer cross-talk which arises because the laser beam L focused onto the L0 layer 20 for reproducing data recorded therein is projected onto the L2 layer 40 and which gets mixed into the signal reproduced from the L0 layer 20 becomes significant. Therefore, the interlayer cross-talk which arises because the laser beam L focused onto the L0 layer 20 for reproducing data recorded therein is projected onto the L2 layer 40 which gets mixed into the signal reproduced from the L0 layer 20 can be decreased by forming the first transparent intermediate layer 12 and the second transparent intermediate layer 13 to have different thicknesses so that the area of the spot the laser beam L component reflected by the L1 layer 30 forms in the L2 layer 40 becomes larger.

In order to sufficiently decrease interlayer cross-talk which arises owing to the spot that the laser beam L component reflected by the L1 layer 30 forms in the L2 layer 40 and which gets mixed into the signal reproduced from the L0 layer 20, it is preferable to form the first transparent intermediate layer 12 and the second transparent intermediate layer 13 so as to satisfy $(Da-Db)/Db \geq 0.05$, more preferably $(Da-Db)/Db \geq 0.10$, when the thickness Da of the first transparent intermediate layer 12 is larger than the thickness Db of the second transparent intermediate layer 13 and it is preferable to form the first transparent intermediate layer 12 and the second transparent intermediate layer 13 so as to satisfy $(Db-Da)/Da \geq 0.05$, more preferably $(Db-Da)/Da \geq 0.10$, when the thickness Da of the first transparent intermediate layer 12 is smaller than the thickness Db of the second transparent intermediate layer 13.

However, if a transparent intermediate layer is formed too thin, interlayer cross-talk between information recording layers located on the opposite sides of the transparent intermediate layer becomes great. It is therefore undesirable to form the first transparent intermediate layer 12 or the second transparent intermediate layer 13 too thin. On the other hand, if one of the second transparent intermediate layer 13 and first transparent intermediate layer 12 is formed thicker, while the thickness of the other of the first transparent intermediate layer 12 and the second transparent intermediate layer 13 is held constant, it becomes difficult to ensure compatibility of the optical recording medium 10 with optical recording media in practical use.

Therefore, in the case where the thickness Da of the first transparent intermediate layer 12 is larger than the thickness Db of the second transparent intermediate layer 13, it is preferable to form the first transparent intermediate layer 12 and the second transparent intermediate layer 13 so as to satisfy $(Da-Db)/Db \leq 1$, more preferably $(Da-Db)/Db \leq 0.7$, and in the case where the thickness Da of the first transparent intermediate layer 12 is smaller than the thickness Db of the second transparent intermediate layer 13, it is preferable to form the first transparent intermediate layer 12 and the second transparent intermediate layer 13 so as to satisfy $(Db-Da)/Da \leq 1$, more preferably $(Db-Da)/Da \leq 0.7$. As a result, in the case where the thickness Da of the first transparent intermediate layer 12 is larger than the thickness Db of the second transparent intermediate layer 13, it is preferable to form the first transparent intermediate layer 12 and the second transparent intermediate layer 13 so as to satisfy $0.05 \leq (Da-Db)/Db \leq 1$, more preferably $0.10 \leq (Da-Db)/Db \leq 0.7$, and in the case where the thickness Da of the first transparent intermediate layer 12 is smaller than the thickness Db of the second transparent intermediate layer 13, it is preferable to form the first transparent intermediate layer 12 and the second transparent intermediate layer 13 so as to satisfy $0.05 \leq (Db-Da)/Da \leq 1$, more preferably $0.10 \leq (Db-Da)/Da \leq 0.7$.

Figure 6:
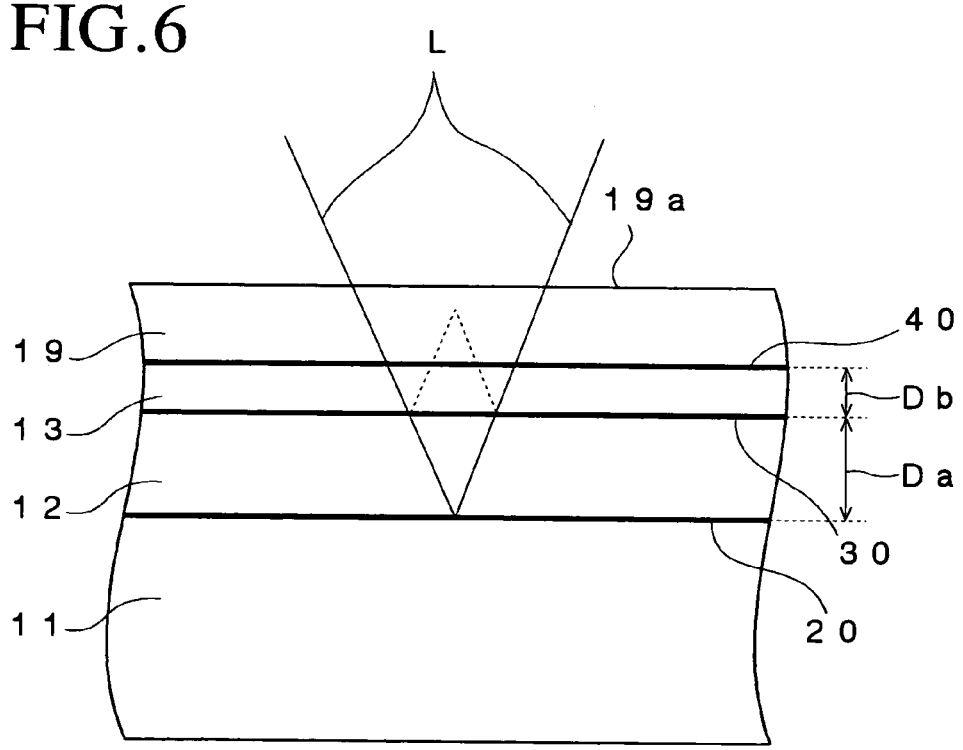
FIG. 6 is a schematic cross-sectional view showing the optical path of a laser beam L in the case where a first transparent intermediate layer and a second transparent intermediate layer are formed so that the thickness Da of the first transparent intermediate layer 12 is larger than the thickness Db of the second transparent intermediate layer 13.

FIG. 6 is a schematic cross-sectional view showing the optical path of a laser beam L in the case where the first transparent intermediate layer 12 and the second transparent intermediate layer 13 are formed so that the thickness Da of the first transparent intermediate layer 12 is larger than the thickness Db of the second transparent intermediate layer 13.

As shown in FIG. 6, in the case where the first transparent intermediate layer 12 and the second transparent intermediate layer 13 are formed so that the thickness Da of the first transparent intermediate layer 12 is larger than the thickness Db of the second transparent intermediate layer 13, when the laser beam L is focused onto the L0 layer 20, the laser beam L component reflected by the L1 layer 30 is focused in the light transmission layer 19. The area of the spot that the laser beam L component forms in the L2 layer 40 therefore becomes more significant and the interlayer cross-talk which arises because the laser beam L focused onto the L0 layer 20 for reproducing data recorded therein is projected onto the L2 layer 40 and which gets mixed into the signal reproduced from the L0 layer 20 becomes less significant.

Figure 7:
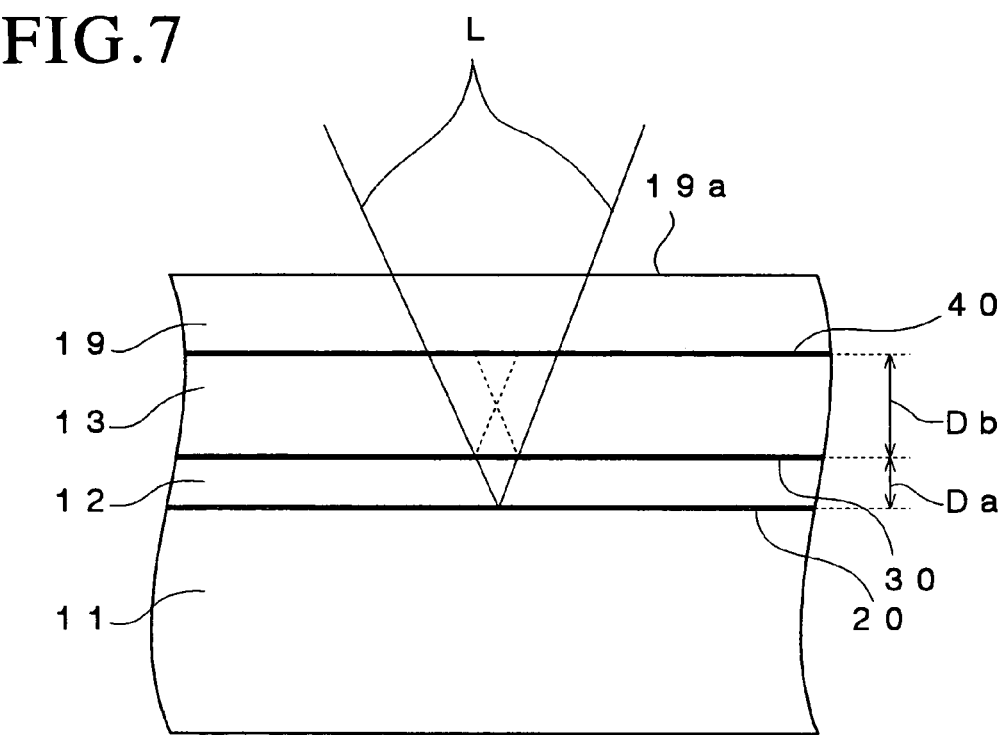
FIG. 7 is a schematic cross-sectional view showing the optical path of a laser beam L in the case where a first transparent intermediate layer and a second transparent intermediate layer are formed so that the thickness Db of the second transparent intermediate layer 12 is larger than the thickness Da of the first transparent intermediate layer 13.

FIG. 7 is a schematic cross-sectional view showing the optical path of a laser beam L in the case where the first transparent intermediate layer 12 and the second transparent intermediate layer 13 are formed so that the thickness Db of the second transparent intermediate layer 13 is larger than the thickness Da of the first transparent intermediate layer 12.

As shown in FIG. 7, in the case where the first transparent intermediate layer 12 and the second transparent intermediate layer 13 are formed so that the thickness Db of the second transparent intermediate layer 13 is larger than the thickness Da of the first transparent intermediate layer 12, when the laser beam L is focused onto the L0 layer 20, the laser beam L component reflected by the L1 layer 30 is focused in the second transparent intermediate layer 13. The area of the spot that the laser beam L component forms in the L2 layer 40 therefore becomes large and the interlayer cross-talk which arises because the laser beam L focused onto the L0 layer 20 for reproducing data recorded therein is projected onto the L2 layer 40 and which gets mixed into the signal reproduced from the L0 layer 20 becomes insignificant.

As described above, interlayer cross-talk which arises because the laser beam L focused onto the L0 layer 20 for reproducing data recorded therein is projected onto the L2 layer 40 and which gets mixed into the signal reproduced from the L0 layer 20 can be decreased by forming the first transparent intermediate layer 12 and the second transparent intermediate layer 13 so as to have different thicknesses. However, in the case where the total thickness (Da+Db) of the first transparent intermediate layer 12 and the second transparent intermediate layer 13 is constant, the area of the spot that the laser beam L component reflected by the L0 layer 20 forms in the L1 layer 30 becomes smaller as the thickness Db of the second transparent intermediate layer 13 becomes larger than the thickness Da of the first transparent intermediate layer 12. As a result, the interlayer cross-talk which arises because the laser beam L focused onto the L1 layer 30 for reproducing data recorded therein is projected onto the L0 layer 20 and which gets mixed into the signal reproduced from the L1 layer 30 increases. However, the area of the spot of the laser beam L component formed in the L2 layer 40 becomes large, whereby interlayer cross-talk which arises because the laser beam L focused onto the L1 layer 30 for reproducing data recorded therein is projected onto the L2 layer 40 and which gets mixed into the signal reproduced from the L1 layer 30 decreases.

On the other hand, in the case where the total thickness (Da+Db) of the first transparent intermediate layer 12 and the second transparent intermediate layer 13 is constant, the area of the spot that the laser beam L component reflected by the L0 layer 20 forms in the L1 layer 30 becomes larger as the thickness Da of the first transparent intermediate layer 12 becomes larger than the thickness Db of the second transparent intermediate layer 13. As a result, the interlayer cross-talk which arises because the laser beam L focused onto the L1 layer 30 for reproducing data recorded therein is projected onto the L0 layer 20 and which gets mixed into the signal reproduced from the L1 layer 30 decreases. However, the area of the spot of the laser beam L component formed in the L2 layer 40 becomes smaller, whereby interlayer cross-talk which arises because the laser beam L focused onto the L1 layer 30 for reproducing data recorded therein is projected onto the L2 layer 40 and which gets mixed into the signal reproduced from the L1 layer 30 increases.

Therefore, in the case where the total thickness (Da+Db) of the first transparent intermediate layer 12 and the second transparent intermediate layer 13 is constant, interlayer cross-talk which arises because the laser beam L focused onto the L1 layer 30 for reproducing data recorded therein is projected onto the other information recording layers and which gets mixed into the signal reproduced from the L1 layer 30 do not vary so much depending upon whether the thickness Db of the second transparent intermediate layer 13 is larger than the thickness Da of the first transparent intermediate layer 12 or the thickness Da of the first transparent intermediate layer 12 is larger than the thickness Db of the second transparent intermediate layer 13.

To the contrary, in the case where the total thickness (Da+Db) of the first transparent intermediate layer 12 and the second transparent intermediate layer 13 is constant, the effect of making the thickness Db of the second transparent intermediate layer. 13 larger than the thickness Da of the first transparent intermediate layer 12 is that when the laser beam L is focused onto the L0 layer 20 to reproduce data therefrom, the area of the spot that the laser beam L component forms in the L1 layer 30 becomes smaller, whereby the interlayer cross-talk which arises because the laser beam L focused onto the L0 layer 20 for reproducing data recorded therein is projected onto the L1 layer 30 and which gets mixed into the signal reproduced from the L0 layer 20 increases but that when the laser beam L is focused onto the L2 layer 40 to reproduce data therefrom, the area of the spot that the laser beam L component reflected by the L1 layer 30 forms in the L2 layer 40 becomes large, whereby interlayer cross-talk which arises because the laser beam L focused onto the L2 layer 40 for reproducing data recorded therein is projected onto the L1 layer 30 and which gets mixed into the signal reproduced from the L2 layer 40 decreases.

On the other hand, in the case where the total thickness (Da+Db) of the first transparent intermediate layer 12 and the second transparent intermediate layer 13 is constant, as the effect of making the thickness Da of the first transparent intermediate layer 12 larger than the thickness Db of the second transparent intermediate layer 13 is that when the laser beam L is focused onto the L0 layer 20 to reproduce data therefrom, the area of the spot that the laser beam L component forms in the L1 layer 30 becomes larger, whereby the interlayer cross-talk which arises because the laser beam L focused onto the L0 layer 20 for reproducing data recorded therein is projected onto the L1 layer 30 and which gets mixed into the signal reproduced from the L0 layer 20 decreases but that when the laser beam L is focused onto the L2 layer 40 to reproduce data therefrom, the area of the spot that the laser beam L component reflected by the L1 layer 30 forms in the L2 layer 40 becomes small, whereby the interlayer cross-talk which arises because the laser beam L focused onto the L2 layer 40 for reproducing data recorded therein is projected onto the L1 layer 30 and which gets mixed into the signal reproduced from the L2 layer 40 increases.

Therefore, in the case where the total thickness (Da+Db) of the first transparent intermediate layer 12 and the second transparent intermediate layer 13 is constant, it is impossible by forming the first transparent intermediate layer 12 and the second transparent intermediate layer 13 so as to have different thicknesses to simultaneously decrease interlayer cross-talk which arises because the laser beam L focused onto the L0 layer 20 for reproducing data recorded therein is projected onto other information recording layers and which gets mixed into the signal reproduced from the L0 layer 20 and the interlayer cross-talk which arises because the laser beam L focused onto the L2 layer 40 for reproducing data recorded therein is projected onto other information recording layers and which gets mixed into the signal reproduced from the L2 layer 40.

However, as described above, a signal reproduced from the L0 layer 20 contains not only interlayer cross-talk caused by the spot that the laser beam L focused onto the L0 layer 20 forms in the L1 layer 30 but also interlayer cross-talk caused by the laser beam L component reflected by the L1 layer 30 and focused onto the L3 layer 50. As a result, the interlayer cross-talk which arises because the laser beam L focused onto the L0 layer for reproducing data recorded therein is projected onto the other information recording layers is the more significant. It is therefore preferable to form the first transparent intermediate layer 12 and the second transparent intermediate layer 13 so that the thickness Da of the first transparent intermediate layer 12 is larger than the thickness Db of the second transparent intermediate layer 13.

Figure 8:
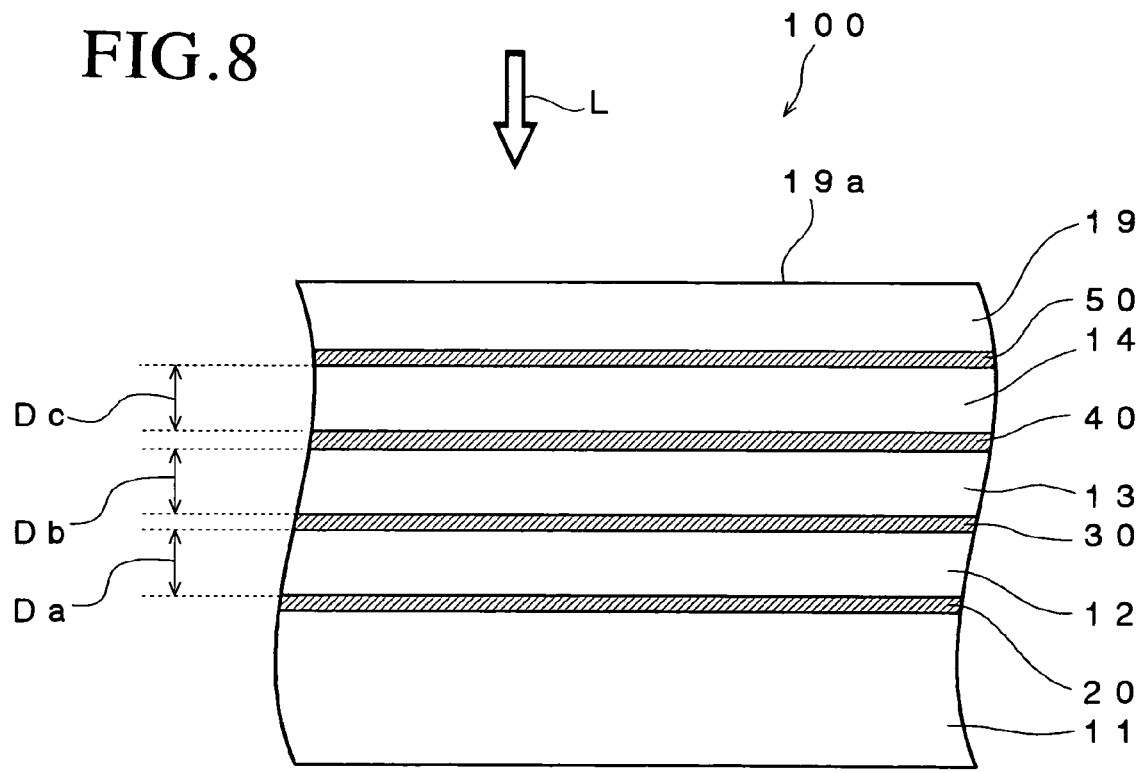
FIG. 8 is a schematic cross-sectional view showing an optical recording medium including four information recording layers.

FIG. 8 is a schematic cross-sectional view showing an optical recording medium including four information recording layers.

Similarly to the optical recording medium 10 shown in FIGS. 1 and 2, an optical recording medium 100 shown in FIG. 8 is formed disk-like and has an outer diameter of about 120 mm and a thickness of about 1.2 mm.

As shown in FIG. 8, the optical recording medium 10 according to this embodiment includes the support substrate 11, the first transparent intermediate layer 12, the second transparent intermediate layer 13, a third transparent intermediate layer 14, the light transmission layer (protective layer) 19, the L0 layer 20 formed between the support substrate 11 and the first transparent intermediate layer 12, the L1 layer 30 formed between the first transparent layer 12 and the second transparent intermediate layer 13, the L2 layer 40 formed between the second transparent layer 13 and the third transparent intermediate layer 14, and an L3 layer 50 formed between the third transparent intermediate layer 14 and the light transmission layer 19.

The L0 layer 20, the L1 layer 30, the L2 layer 40 and the L layer 50 are information recording layers in which data are recorded, i.e., the optical recording medium 10 shown in FIG. 8 includes four information recording layers.

The L0 layer 20, the L1 layer 30, the L2 layer 40 and the L3 layer 50 are formed in this order from the side of the support substrate 11 so that the L0 layer 20 constitutes a farthest information recording layer from a light incidence plane 19a and the L3 layer 50 constitutes a closest information recording layer to the light incidence plane 19a.

Therefore, when data are to be recorded in the L0 layer 20 or data recorded in the L0 layer 20 are to be reproduced, a laser beam L is projected onto the L0 layer 20 via the L1 layer 30, the L2 layer 40 and the L3 layer 50, when data are to be recorded in the L1 layer 30 or data recorded in the L1 layer 30 are to be reproduced, the laser beam L is projected onto the L1 layer 30 via the L2 layer 40 and the L3 layer 50, and when data are to be recorded in the L2 layer 40 or data recorded in the L2 layer 40 are to be reproduced, the laser beam L is projected onto the L2 layer 40 via the L3 layer 50.

The third transparent intermediate layer 14 serves to space the L2 layer 40 and the L3 layer 50 apart by a physically and optically sufficient distance and grooves (not shown) and lands (not shown) are alternately and spirally formed on the surface thereof so as to extend from a portion in the vicinity of the center of the third transparent intermediate layer 14 toward the outer circumference thereof.

The third transparent intermediate layer 14 can be formed of materials usable for forming the first transparent intermediate layer 12 and the second transparent intermediate layer 13.

The L3 layer 50 may be formed either as a write-once type information recording layer that enables writing but not rewriting of data or as a data rewritable information recording layer, but it is constituted as a write-once information recording layer in this embodiment, similarly to the L0 layer 20, the L1 layer 30 and the L2 layer 40.

In the case where data recorded in the thus constituted optical recording medium 100 are to be reproduced, a laser beam L is projected onto the optical recording medium 100 from the side of the light incidence plane 19a and the focus of the laser beam L is adjusted onto the L0 layer 20, the L1 layer 30, the L2 layer 40 or the L3 layer 50 in which data to be reproduced are recorded.

Figure 9:
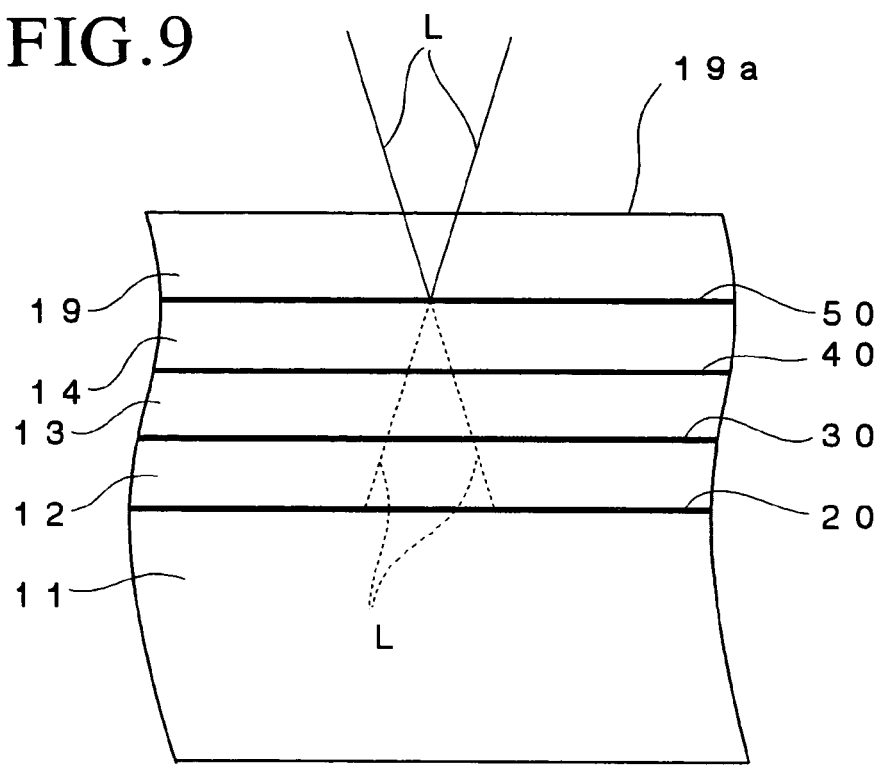
FIG. 9 is a schematic cross-sectional view showing the optical path of a laser beam L when data recorded in the L3 layer of an optical recording medium are to be reproduced in the case where the thickness of a first transparent intermediate layer, that of a second transparent intermediate layer and that of a third transparent intermediate layer are substantially the same.

FIG. 9 is a schematic cross-sectional view showing the optical path of the laser beam L when data recorded in the L3 layer 50 of the optical recording medium 100 are to be reproduced in the case where the thickness of the first transparent intermediate layer 12, that of the second transparent intermediate layer 13 and that of the third transparent intermediate layer 14 are substantially the same.

As shown in FIG. 9, in the case where data recorded in the L3 layer 50 of the optical recording medium 100 are to be reproduced, the laser beam L is focused onto the L3 layer 50.

The amount of the laser beam L reflected by the L3 layer 50 depends on the reflective coefficient of the L3 layer 50 within the spot of the laser beam L, namely, on whether or not a record mark is formed within the spot of the laser beam L and it is possible to reproduce data recorded in the L3 layer 50 of the optical recording medium 100 by detecting the amount of the laser beam L reflected by the L3 layer 50.

When the laser beam L is focused onto the L3 layer 50, spots of the laser beam L are formed in the L0 layer 20, the L1 layer 30 and the L2 layer 40. Therefore, when data recorded in the L3 layer 50 are to be reproduced by detecting the amount of laser beam L reflected by the optical recording medium 100, the laser beam L components reflected by the L0 layer 20, the L1 layer 30 and the L2 layer 40 are simultaneously detected. Because of this, the reflective coefficient distribution of the L0 layer 20, the L1 layer 30 and the L2 layer 40 within the spots formed therein influences the amount the laser beam L reflected by the optical recording medium 100 and detected, and a signal obtained by reproducing data recorded in the L3 layer 50 is influenced by the laser beam L components reflected by the L0 layer 20, the L1 layer 30 and the L2 layer 40 to generate interlayer cross-talk.

The interlayer cross-talk which arises because the laser beam L focused onto an information recording layer for reproducing data stored therein is projected onto other information recording layers than the reproduced information recording layer and which gets mixed into the signal reproduced from the information recording layer increases as the spot area of the laser beam L formed in the information recording layers other than the reproduced information recording layer is smaller. The interlayer cross-talk which arises because the laser beam L focused onto the L3 layer 50 for reproducing data recorded therein is projected onto the L2 layer 40 next to the L3 layer 50 and which gets mixed into the signal reproduced from the L3 layer 50 is relatively significant, but the interlayer cross-talk which arises because the laser beam L focused onto the L3 layer 50 for reproducing data recorded therein is projected onto the L1 layer 30 and which gets mixed into the signal reproduced from the L3 layer 50 is insignificant and the interlayer cross-talk which arises because the laser beam L focused onto the L3 layer 50 for reproducing data recorded therein is projected onto the L0 layer 20 and which gets mixed into the signal reproduced from the L3 layer 50 is extremely insignificant.

Figure 10:
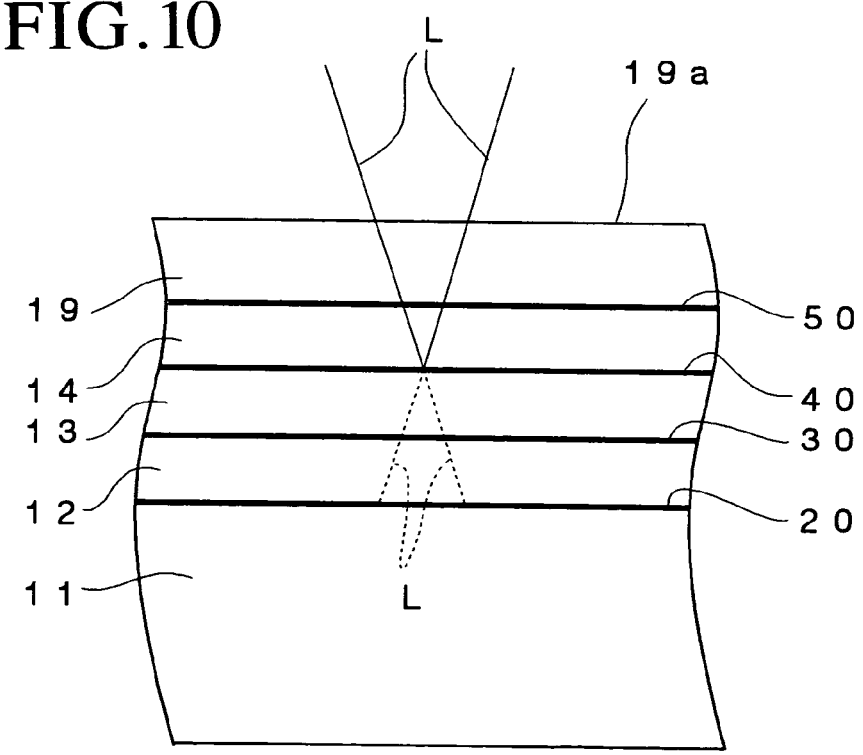
FIG. 10 is a schematic cross-sectional view showing the optical path of the laser beam L when data recorded in the L2 layer of an optical recording medium are to be reproduced in the case where the thickness of a first transparent intermediate layer, that of a second transparent intermediate layer and that of a third transparent intermediate layer are substantially the same.

FIG. 10 is a schematic cross-sectional view showing the optical path of the laser beam L when data recorded in the L2 layer 40 of the optical recording medium 100 are to be reproduced in the case where the thickness of the first transparent intermediate layer 12, that of the second transparent intermediate layer 13 and that of the third transparent intermediate layer 14 are substantially the same.

As shown in FIG. 10, in the case where data recorded in the L2 layer 40 of the optical recording medium 100 are to be reproduced, the laser beam L is focused onto the L2 layer 40 and the amount of the laser beam L reflected by the optical recording medium 100 is detected.

When the laser beam L is focused onto the L2 layer 40, spots of the laser beam L are formed in the L0 layer 20, the L1 layer 30 and the L3 layer 50. Therefore, when data recorded in the L2 layer 40 are to be reproduced by detecting the amount of laser beam L reflected by the optical recording medium 100, the laser beam L components reflected by the L0 layer 20, the L1 layer 30 and the L3 layer 50 are simultaneously detected. Because of this, the reflective coefficient distribution of the L0 layer 20, the L1 layer 30 and the L3 layer 50 within the spots formed therein influences the amount the laser beam L reflected by the optical recording medium 100 and detected, and a signal obtained by reproducing data recorded in the L2 layer 40 is influenced by the laser beam L components reflected by the L0 layer 20, the L1 layer 30 and the L3 layer 50 to generate interlayer cross-talk.

Since the L1 layer 30 and the L3 layer 50 are located next to the L2 layer 40, the interlayer cross-talk which arises because the laser beam L focused onto the L2 layer 40 for reproducing data recorded therein is projected onto the L1 layer 30 and which gets mixed into the signal reproduced from the L2 layer 40 and the interlayer cross-talk which arises because the laser beam L focused onto the L2 layer 40 for reproducing data recorded therein is projected onto the L3 layer 50 which gets mixed into the signal reproduced from the L2 layer 40 are both relatively substantial. On the other hand, since the second transparent intermediate layer 13, the L1 layer 30 and the first transparent intermediate layer 12 are interposed between the L2 layer 40 and the L0 layer 20, the interlayer cross-talk which arises because the laser beam L focused onto the L2 layer 40 for reproducing data recorded therein is projected onto the L0 layer 20 and which gets mixed into the signal reproduced from the L2 layer 40 is insignificant.

Figure 11:
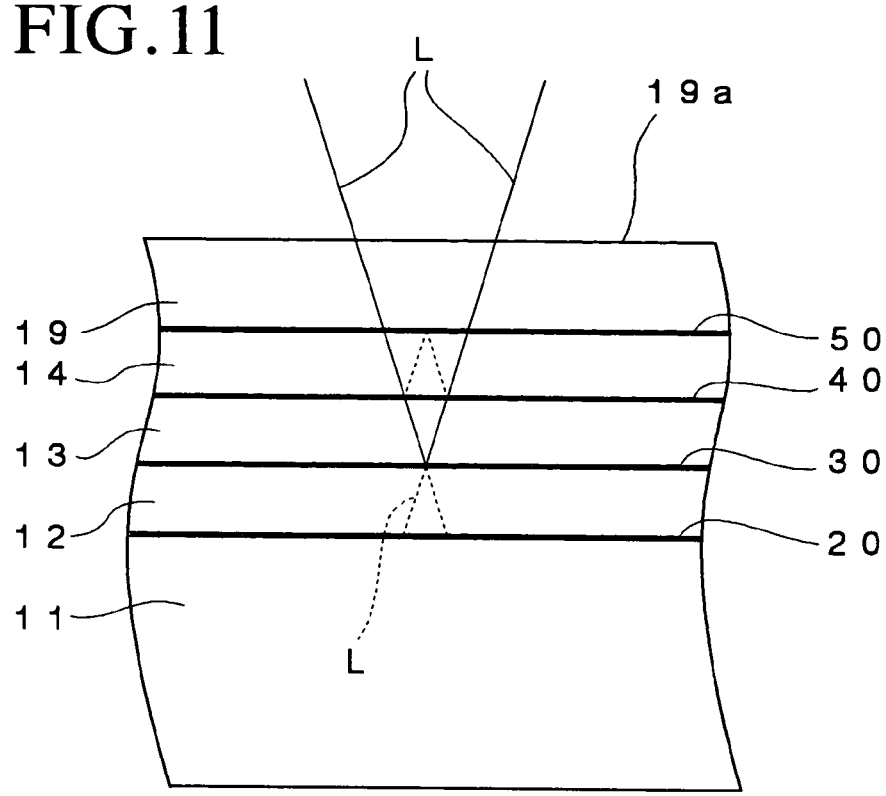
FIG. 11 is a schematic cross-sectional view showing the optical path of the laser beam L when data recorded in the L1 layer of an optical recording medium are to be reproduced in the case where the thickness of a first transparent intermediate layer, that of a second transparent intermediate layer and that of a third transparent intermediate layer are substantially the same.

FIG. 11 is a schematic cross-sectional view showing the optical path of the laser beam L when data recorded in the L1 layer 30 of the optical recording medium 100 are to be reproduced in the case where the thickness of the first transparent intermediate layer 12, that of the second transparent intermediate layer 13 and that of the third transparent intermediate layer 14 are substantially the same.

As shown in FIG. 11, in the case where data recorded in the L1 layer 30 of the optical recording medium 100 are to be reproduced, the laser beam L is focused onto the L1 layer 30 and the amount of the laser beam L reflected by the optical recording medium 100 is detected.

When the laser beam L is focused onto the L1 layer 30, spots of the laser beam L are formed in the L0 layer 20, the L2 layer 40 and the L3 layer $50_o$ Therefore, when data recorded in the L1 layer 30 are to be reproduced by detecting the amount of laser beam L reflected by the optical recording medium 100, the laser beam L components reflected by the L0 layer 20, the L2 layer 40 and the L3 layer 50 are simultaneously detected. Therefore, the reflective coefficient distribution of the L0 layer 20, the L2 layer 40 and the L3 layer 50 within the spots formed therein influences the amount the laser beam L reflected by the optical recording medium 100 and detected, and a signal obtained by reproducing data recorded in the L1 layer 30 is influenced by the laser beam L components reflected by the L0 layer 20, the L2 layer 40 and the L3 layer 50 to generate interlayer cross-talk.

As shown in FIG. 11, in the case where the thickness of the first transparent intermediate layer 12 is substantially the same as that of the second transparent intermediate layer 13, when the laser beam L is focused onto the L1 layer 30, the laser beam L component reflected by the L2 layer 40 is focused onto the L3 layer 50 or a portion in the vicinity of the L3 layer 50 and the area of the spot that the laser beam L component reflected by the L2 layer 40 forms in the L3 layer 50 or the portion in the vicinity thereof is extremely small. Therefore, the interlayer cross-talk which arises because the laser beam L focused onto the L1 layer 30 for reproducing data recorded therein is projected onto the L3 layer 50 and which gets mixed into the signal reproduced from the L1 layer 30 becomes extremely significant. On the other hand, since the L0 layer 20 and the L2 layer 40 are located next to the L1 layer 30, the interlayer cross-talk which arises because the laser beam L focused onto the L1 layer 30 for reproducing data recorded therein is projected onto the L0 layer 20 and which gets mixed into the signal reproduced from the L1 layer 30 and the interlayer cross-talk which arises because the laser beam L focused onto the L1 layer 30 for reproducing data recorded therein is projected onto the L2 layer 40 and which gets mixed into the signal reproduced from the L1 layer 30 are both relatively significant but less significant than interlayer cross-talk which arises because the laser beam L focused onto the L1 layer 30 for reproducing data recorded therein is projected onto the L3 layer 50 and which gets mixed into the signal reproduced from the L1 layer 30.

Figure 12:
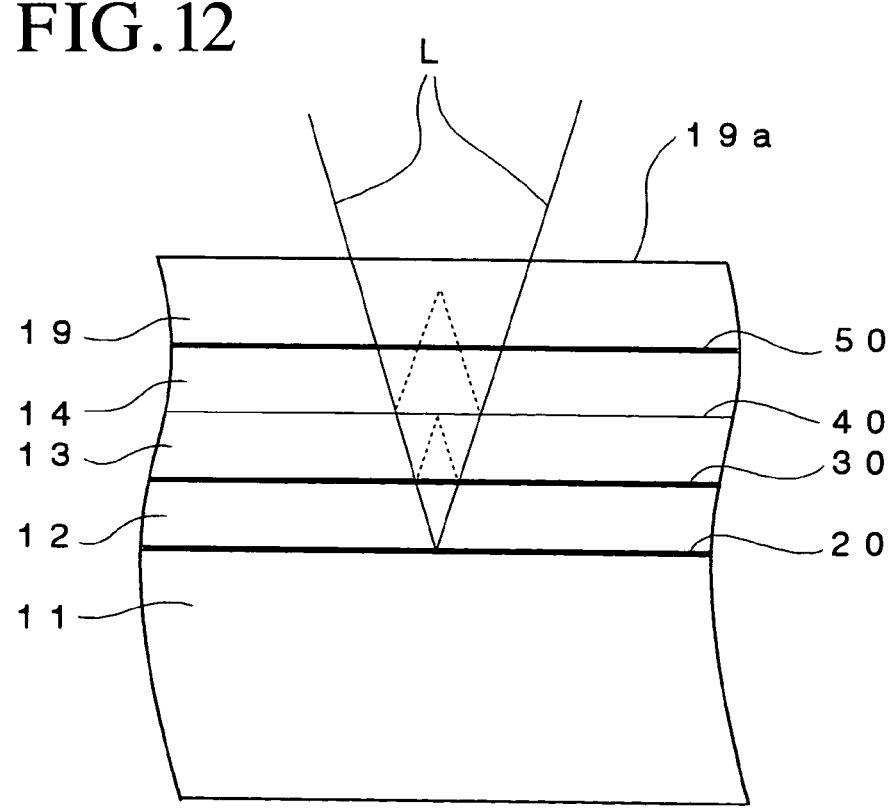
FIG. 12 is a schematic cross-sectional view showing the optical path of the laser beam L when data recorded in the L0 layer of an optical recording medium are to be reproduced in the case where the thickness of a first transparent intermediate layer, that of a second transparent intermediate layer and that of a third transparent intermediate layer are substantially the same.

FIG. 12 is a schematic cross-sectional view showing the optical path of the laser beam L when data recorded in the L0 layer 20 of the optical recording medium 100 are to be reproduced in the case where the thickness of the first transparent intermediate layer 12, that of the second transparent intermediate layer 13 and that of the third transparent intermediate layer 14 are substantially the same.

As shown in FIG. 12, in the case where data recorded in the L0 layer 20 of the optical recording medium 100 are to be reproduced, the laser beam L is focused onto the L0 layer 20 and the amount of the laser beam L reflected by the optical recording medium 100 is detected.

When the laser beam L is focused onto the L0 layer 20, spots of the laser beam L are formed in the L1 layer 30, the L2 layer 40 and the L3 layer $50_o$ Therefore, when data recorded in the L0 layer 20 are to be reproduced by detecting the amount of laser beam L reflected by the optical recording medium 100, the laser beam L components reflected by the L1 layer 30, the L2 layer 40 and the L3 layer 50 are simultaneously detected. Therefore, the reflective coefficient distribution of the L1 layer 30, the L2 layer 40 and the L3 layer 50 within the spots formed therein influences the amount the laser beam L reflected by the optical recording medium 100 and detected, and a signal obtained by reproducing data recorded in the L0 layer 20 is influenced by the laser beam L components reflected by the L1 layer 30, the L2 layer 40 and the L3 layer 50 to generate interlayer cross-talk.

As shown in FIG. 12, in the case where the thickness of the first transparent intermediate layer 12 is substantially the same as that of the second transparent intermediate layer 13, when the laser beam L is focused onto the L0 layer 20, the laser beam L component reflected by the L1 layer 30 is focused onto the L2 layer 40 or a portion in the vicinity of the L2 layer 40 and the area of the spot that the laser beam L component reflected by the L1 layer 30 forms in the L2 layer 40 or a portion in the vicinity thereof is extremely small. Therefore, interlayer cross-talk which arises because the laser beam L focused onto the L0 layer 20 for reproducing data recorded therein is projected onto the L2 layer 40 and which gets mixed into the signal reproduced from the L0 layer 20 becomes extremely significant. On the other hand, although the laser beam L is reflected by the L2 layer 40, since the laser beam L component reflected by the L2 layer 40 is focused in the light transmission layer 19, the area of the spot that the laser beam L component reflected by the L2 layer 40 forms in the L3 layer 50 is large. Therefore, the interlayer cross-talk which arises because the laser beam L focused onto the L0 layer 20 for reproducing data recorded therein is projected onto the L3 layer 50 and which gets mixed into the signal reproduced from the L0 layer 20 is insignificant. To the contrary, since the L1 layer 30 is next to the L0 layer 20, the interlayer cross-talk which arises because the laser beam L focused onto the L0 layer 20 for reproducing data recorded therein is projected onto the L1 layer 30 and which gets mixed into the signal reproduced from the L0 layer 20 is relatively significant but less significant than interlayer cross-talk which arises because the laser beam L focused onto the L0 layer 20 for reproducing data recorded therein is projected onto the L2 layer 40 and gets mixed into the signal reproduced from the L0 layer 20.

Therefore, in the case where the thickness of the first transparent intermediate layer 12, the thickness of the second transparent intermediate layer 13 and the thickness of the third transparent intermediate layer 14 are substantially the same, the influence of interlayer cross-talk is most significant when data recorded in the L1 layer 30 are reproduced, the influence of interlayer cross-talk is next most significant when data recorded in the L0 layer 20 are reproduced and the influence of interlayer cross-talk is least significant when data recorded in the L3 layer 50 are reproduced.

As described above, since the laser beam L component reflected by the L2 layer 40 is focused onto the L3 layer 50 or a portion in the vicinity of the L3 layer 50 and the area of the spot that the laser beam L component reflected by the L2 layer 40 forms in the L3 layer 50 becomes extremely small, the interlayer cross-talk which arises because the laser beam L focused onto the L1 layer 30 for reproducing data recorded therein is projected onto the L3 layer 50 and which gets mixed into the signal reproduced from the L1 layer 30 becomes significant, and therefore, interlayer cross-talk which arises because the laser beam L focused onto the L1 layer 30 for reproducing data recorded therein is projected onto the L3 layer 50 and gets mixed into the signal reproduced from the L1 layer 30 can be decreased by forming the second transparent intermediate layer 13 and the third transparent intermediate layer 14 so that they have different thicknesses and that the area of the spot of the laser beam L component reflected by the L2 layer 40 formed in the L3 layer 50 becomes larger.

On the other hand, since the laser beam L component reflected by the L1 layer 30 is focused onto the L2 layer 40 or a portion in the vicinity of the L2 layer 40 and the area of the spot that the laser beam L component reflected by the L1 layer 30 forms in the L2 layer 40 becomes extremely small, the interlayer cross-talk which arises because the laser beam L focused onto the L0 layer 20 for reproducing data recorded therein is projected onto the L2 layer 40 and which gets mixed into the signal reproduced from the L0 layer 20 becomes large and therefore, interlayer cross-talk which arises because the laser beam L focused onto the L0 layer 20 for reproducing data recorded therein is projected onto the L2 layer 40 and gets mixed into the signal reproduced from the L0 layer 20 can be decreased by forming the first transparent intermediate layer 12 and the second transparent intermediate layer 13 so that they have different thicknesses and that the area of the spot that the laser beam L component reflected by the L1 layer 30 forms in the L2 layer 40 becomes larger.

Figure 13:
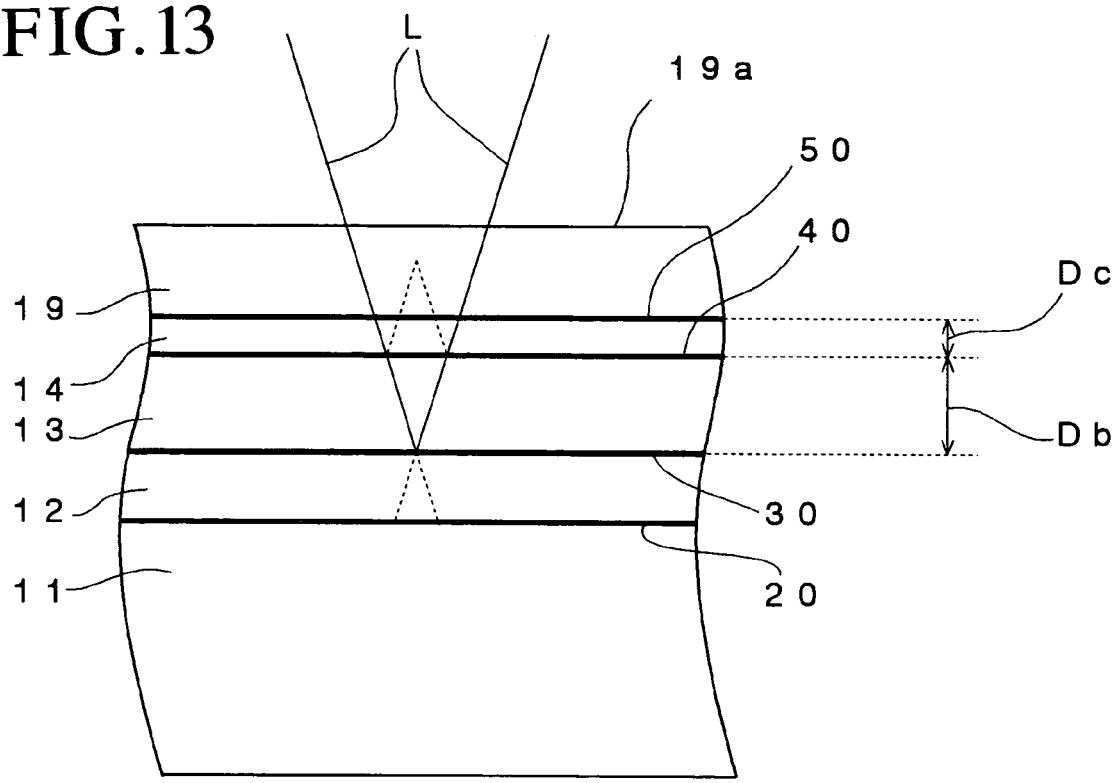
FIG. 13 is a schematic cross-sectional view showing the optical path of a laser beam L focused onto an L1 layer in the case where a first transparent intermediate layer, a second transparent intermediate layer and a third transparent intermediate layer are formed so that the thickness Db of the second transparent intermediate layer is larger than the thickness Da of the first transparent intermediate layer and the thickness Dc of the third transparent intermediate layer.

FIG. 13 is a schematic cross-sectional view showing the optical path of a laser beam L focused onto the L1 layer 30 in the case where the first transparent intermediate layer 13, the second transparent intermediate layer 14 and the third transparent intermediate layer 14 are formed so that the thickness Db of the second transparent intermediate layer 13 is larger than the thickness Da of the first transparent intermediate layer 12 and the thickness Dc of the third transparent intermediate layer 14.

As shown in FIG. 13, in the case where the first transparent intermediate layer 13, the second transparent intermediate layer 14 and the third transparent intermediate layer 14 are formed so that the thickness Db of the second transparent intermediate layer 13 is larger than the thickness Da of the first transparent intermediate layer 12 and the thickness Dc of the third transparent intermediate layer 14, when the laser beam L is focused onto the L1 layer 30, the laser beam L component reflected by the L2 layer 40 is focused in the light transmission layer 19. The area of the spot formed by the laser beam L and in the L3 layer 50 becomes and the interlayer cross-talk which arises because the laser beam L focused onto the L1 layer 30 for reproducing data recorded therein is projected onto the L3 layer 50 and gets mixed into the signal reproduced from the L1 layer 30 becomes insignificant.

Figure 14:
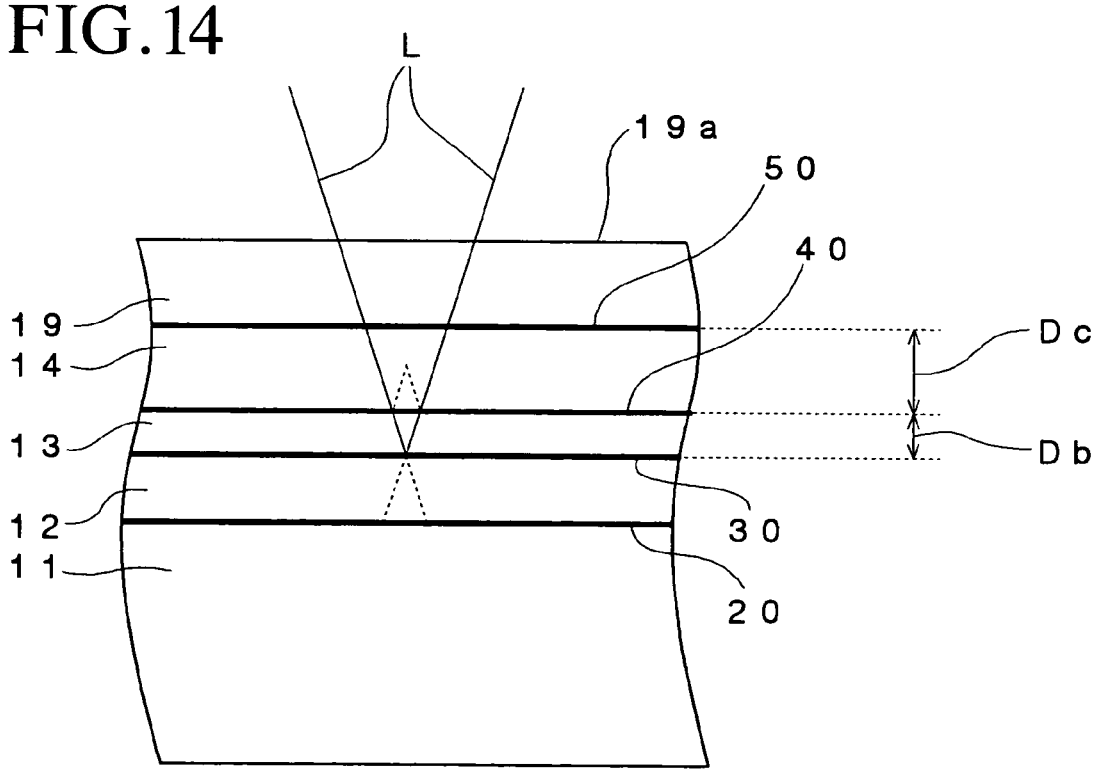
FIG. 14 is a schematic cross-sectional view showing the optical path of a laser beam L focused onto an L1 layer in the case where a first transparent intermediate layer, a second transparent intermediate layer and a third transparent intermediate layer are formed so that the thickness Db of the second transparent intermediate layer is smaller than the thickness Da of the first transparent intermediate layer and the thickness Dc of the third transparent intermediate layer.

FIG. 14 is a schematic cross-sectional view showing the optical path of a laser beam L focused onto the L1 layer 30 in the case where the first transparent intermediate layer 13, the second transparent intermediate layer 14 and the third transparent intermediate layer 14 are formed so that the thickness Db of the second transparent intermediate layer 13 is smaller than the thickness Da of the first transparent intermediate layer 12 and the thickness Dc of the third transparent intermediate layer 14.

As shown in FIG. 14, in the case where the first transparent intermediate layer 13, the second transparent intermediate layer 14 and the third transparent intermediate layer 14 are formed so that the thickness Db of the second transparent intermediate layer 13 is smaller than the thickness Da of the first transparent intermediate layer 12 and the thickness Dc of the third transparent intermediate layer 14, when the laser beam L is focused onto the L1 layer 30, the laser beam L component reflected by the L2 layer 40 is focused in the third transparent intermediate layer 14, the area of a spot of the laser beam L formed in the L3 layer 50 becomes large and interlayer cross-talk that arises because the laser beam L focused onto the L1 layer 30 for reproducing data recorded therein is projected onto the L3 layer 50 and gets mixed into the signal reproduced from the L1 layer 30 becomes insignificant.

In order to prevent the total thickness of the first transparent intermediate layer 12, the second transparent intermediate layer 13 and the third transparent intermediate layer 14 from greatly varying and ensure compatibility of the optical recording medium 100 with optical recording media already in practical use, it is preferable to form the first transparent intermediate layer 12, the second transparent intermediate layer 13 so that the thickness Db of the second transparent intermediate layer 13 is larger than the thickness Da of the first transparent intermediate layer 12 and the thickness Dc of the third transparent intermediate layer 14.

The relationship between the thickness Da of the first transparent intermediate layer 12 and the thickness Dc of the third transparent intermediate layer 14 is not particularly limited but since the interlayer cross-talk which arises because the laser beam L focused onto the L0 layer 20 for reproducing data recorded therein is projected onto the other information recording layers and which gets mixed into the signal reproduced from the L0 layer 20 tends to become more significant than interlayer cross-talk which arises because the laser beam L focused onto the L1 layer 30 for reproducing data recorded therein is projected onto the other information recording layers and gets mixed into the signal reproduced from the L1 layer 30, it is preferable to form the first transparent intermediate layer 12 and the third transparent intermediate layer 14 so that the thickness Da of the first transparent intermediate layer 12 is larger than the thickness Dc of the third transparent intermediate layer 14, namely, to satisfy Db>Da>Dc.

Figure 15:
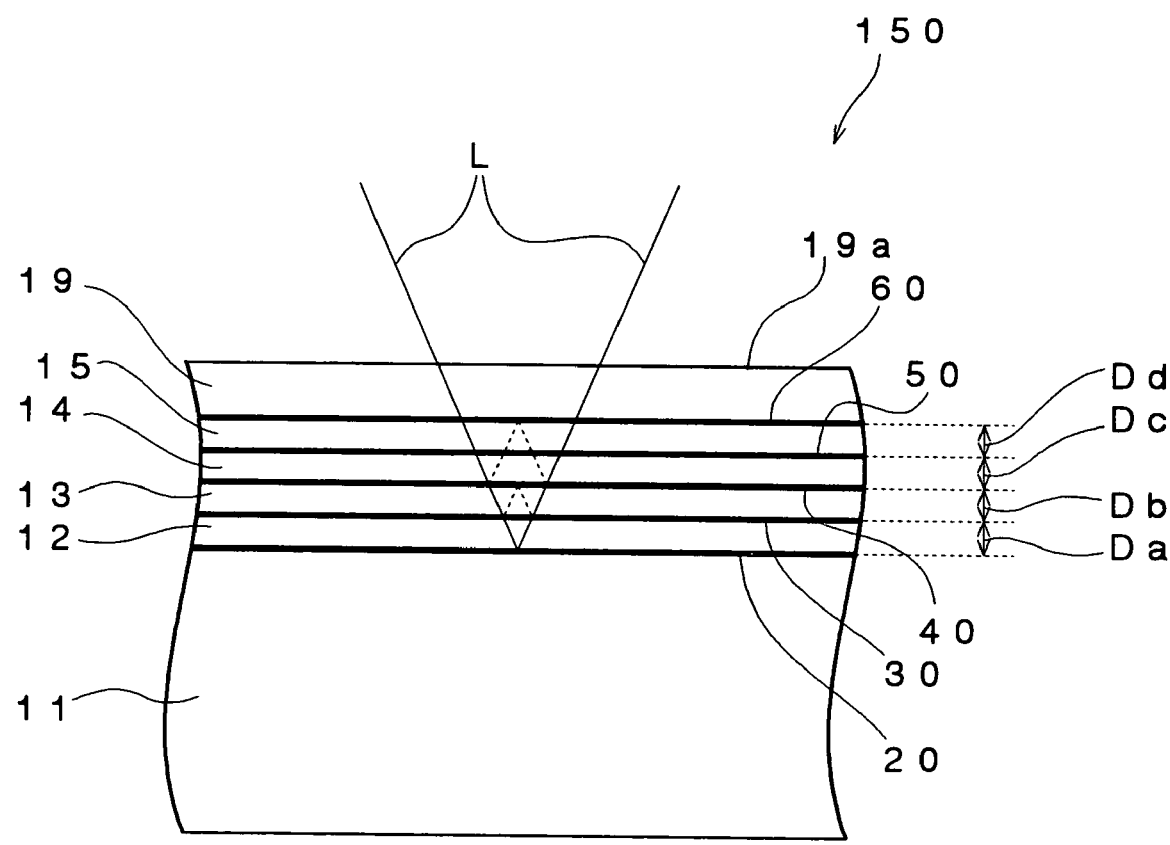
FIG. 15 is a schematic cross-sectional view showing an optical recording medium including five information recording layers.

FIG. 15 is a schematic cross-sectional view showing an optical recording medium including five information recording layers.

As shown in FIG. 15, the optical recording medium 150 is formed by laminating an L0 layer 20, a first transparent intermediate layer 12, an L1 layer 30, a second transparent intermediate layer 13, an L2 layer 40, a third transparent intermediate layer 14, an L3 layer 50, a fourth transparent intermediate layer 15, an L4 layer 60 and a light transmission layer 19a on a support substrate 11 in this order.

In the optical recording medium 150 shown in FIG. 15, the thickness Da of the first transparent intermediate layer 12, the thickness Db of the second transparent intermediate layer 13, the thickness Dc of the third transparent intermediate layer 14 and the thickness Db of the fourth transparent intermediate layer 15 are equal to each other. Therefore, when the laser beam L is focused onto the L0 layer 20 for reproducing data recorded in the L0 layer 20, the laser beam L component reflected by the L1 layer 30 is focused onto the L2 layer 40 and the laser beam L component reflected by the L2 layer 40 is focused onto the L4 layer 60.

As a result, significant interlayer cross-talk is caused in the signal reproduced from the L0 layer 20 by the laser beam L projected onto the L0 layer 20 and focused onto the L2 layer 40 and the laser beam L projected onto the L0 layer 20 and focused onto the L4 layer 60.

Therefore, in the optical recording medium 150 having five information recording layers, it is preferable to form the first transparent intermediate layer 12, the second transparent intermediate layer 13, the third transparent intermediate layer 14 and the fourth transparent intermediate layer 15 in such a manner that the first transparent intermediate layer 12 and the second transparent intermediate layer 13 have different thicknesses, the second transparent intermediate layer 13 and the third transparent intermediate layer 14 have different thicknesses and the third transparent intermediate layer 14 and the fourth transparent intermediate layer 15 have different thicknesses. It is further preferable to form the first transparent intermediate layer 12, the second transparent intermediate layer 13, the third transparent intermediate layer 14 and the fourth transparent intermediate layer 15 in such a manner that the total thickness (Da+Db) of the first transparent intermediate layer 12 and the second transparent intermediate layer 13 and the total thickness (Dc+Da) of the third transparent intermediate layer 14 and the fourth transparent intermediate layer 15 are different from each other.

WORKING EXAMPLES AND COMPARATIVE EXAMPLES

Hereinafter, working examples will be set out in order to further clarify the advantages of the present invention.

Working Example 1

An optical recording medium sample # 1 was fabricated in the following manner.

A disk-like polycarbonate substrate having a thickness of 1.1 mm and a diameter of 120 mm and formed with grooves and lands on the surface thereof was first fabricated by an injection molding process so that the track pitch (groove pitch) was equal to 0.32 µm.

Then, the polycarbonate substrate was set on a sputtering apparatus and a reflective film consisting of an alloy of Ag, Pd and Cu and having a thickness of 100 nm, a second dielectric film containing a mixture of ZnS and $SiO_2$ and having a thickness of 39 nm, a second L0 recording film containing Cu as a primary component, added with 23 atomic % of Al and 13 atomic % of Au and having a thickness of 5 nm, a first L0 recording film containing Si as a primary component and having a thickness of 5 nm and a first dielectric film containing the mixture of ZnS and $SiO_2$ and having a thickness of 20 nm were sequentially formed on the surface of the polycarbonate substrate on which the grooves and lands were formed, using the sputtering process, thereby forming an L0 layer on the surface of the polycarbonate substrate.

The mole ratio of ZnS to $SiO_2$ in the mixture of ZnS and $SiO_2$ contained in the first dielectric layer and the second dielectric layer was 80:20.

Further, the polycarbonate substrate formed with the L0 layer on the surface thereof was set on a spin coating apparatus and the L0 layer was coated with a resin solution prepared by dissolving acrylic ultraviolet curable resin in a solvent to form a coating layer while the polycarbonate substrate was being rotated. Then, a stamper formed with grooves and lands was placed on the surface of the coating layer and the surface of the coating layer was irradiated with an ultraviolet ray via the stamper, thereby curing the acrylic ultraviolet curable resin. A first transparent intermediate layer having a thickness Da of 10 µm and formed with grooves and lands on the surface thereof so that the track pitch (groove pitch) was equal to 0.32 µm was formed by removing the stamper.

Then, the polycarbonate substrate formed with the L0 layer and the first transparent intermediate layer on the surface thereof was set on the sputtering apparatus and an L1 layer having a thickness of 32 nm was formed on the first transparent intermediate layer by a sputtering process using a target of the mixture of ZnS to $SiO_2$ and a target of Mg so as to contain the mixture of ZnS to $SiO_2$ at the mole ratio of 50:50.

Further, a second transparent intermediate layer having a thickness Db of 10 µm was formed on the L1 layer in a similar manner to that of forming the first transparent intermediate layer on the L0 layer and an L2 layer having a thickness of 24 nm was then formed on the second transparent intermediate layer in a similar manner to that of forming the L1 layer on the first transparent intermediate layer.

Further, a third transparent intermediate layer having a thickness Dc of 10 μm was formed on the L2 layer in a similar manner to that of forming the first transparent intermediate layer on the L0 layer and an L2 layer having a thickness of 18 nm was then formed on the third transparent intermediate layer in a similar manner to that of forming the L1 layer on the first transparent intermediate layer.

Finally, the L3 layer was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 85 μm.

Thus, the optical recording medium sample # 1 was fabricated.

The optical recording medium sample # 1 was set in a DDU1000 optical recording medium evaluation apparatus manufactured by Pulstec Industrial Co., Ltd. and a laser beam having a wavelength of 405 nm was focused onto the L3 layer using an objective lens whose numerical aperture was 0.85 via the light transmission layer while the sample was rotated at a linear velocity of 5.3 m/sec, thereby recording 2T signals therein in the 1,7 RLL Modulation Mode.

Then, a laser beam was focused onto each of the L0 layer, the L1 layer, L2 layer and the L3 layer using the optical recording medium evaluation apparatus mentioned above and an 8T signal recorded in each of the L0 layer, the L1 layer, L2 layer and the L3 layer was reproduced.

Figure 16:
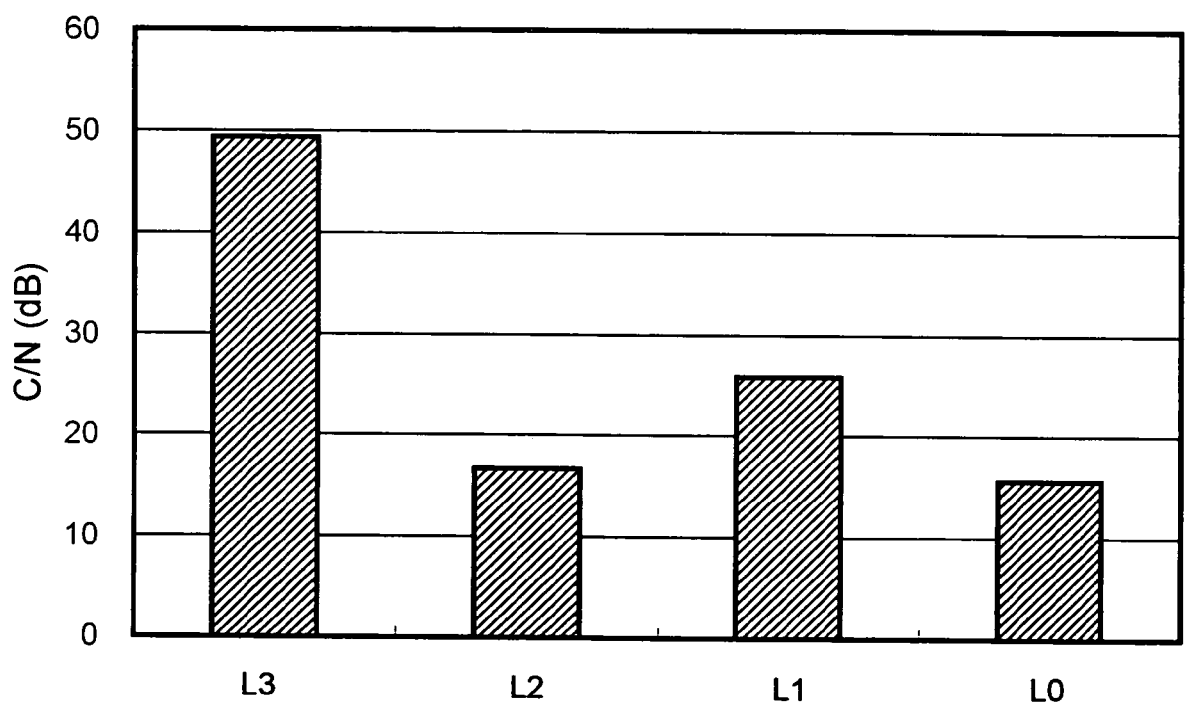
FIG. 16 is a graph showing levels of signals reproduced from an L0 layer, L1 layer, L2 layer and L3 layer in Working Example 1.

The intensity of the signal reproduced from each of the L0 layer, the L1 layer, L2 layer and the L3 layer is shown in FIG. 16.

As shown in FIG. 16, although no data were recorded in the L0 layer, the L1 layer and the L2 layer, a signal was reproduced from each of the L0 layer, the L1 layer and the L2 layer because the laser beam was projected onto the L3 layer when the laser beam was focused on each of the L0 layer, the L1 layer and the L2 layer. The reproduced signal from each of the L0 layer, the L1 layer and the L2 layer corresponds to interlayer cross-talk.

As shown in FIG. 16, the influence of interlayer cross-talk is maximum in the L1 layer and is much more significant than in the cross-talk from the L2 layer and L0 layer. It is reasonable to conclude that this is because the thickness Db of the second transparent intermediate layer and the thickness Dc of the third transparent intermediate layer were equal and the laser beam focused onto the L1 layer was reflected by the L2 layer to be focused onto the L3 layer in which the 8T signal was recorded, whereby the spot area of the laser beam formed in the L3 layer was extremely small.

To the contrary, it can be considered that the influence of interlayer cross-talk in the L2 layer was larger than that in the L0 layer because the L2 layer was closer to the L3 layer than the L0 layer.

Working Example 2

An optical recording medium sample # 1 was fabricated in the following manner.

A disk-like polycarbonate substrate having a thickness of 1.1 mm and a diameter of 120 mm and formed with grooves and lands on the surface thereof was first fabricated by an injection molding process so that the track pitch (groove pitch) was equal to 0.32 μm.

Then, the polycarbonate substrate was set on a sputtering apparatus and an L0 layer having a thickness of 32 nm was formed on the surface of the polycarbonate substrate on which the grooves and lands were formed, by the sputtering process using a target of the mixture of ZnS to $SiO_2$ and a target of Mg so as to contain the mixture of ZnS to $SiO_2$ at the mole ratio of 50:50.

Further, the polycarbonate substrate formed with the L0 layer on the surface thereof was set on a spin coating apparatus and the L0 layer was coated with a resin solution prepared by dissolving acrylic ultraviolet curable resin in a solvent to form a coating layer while the polycarbonate substrate was being rotated. Then, a stamper formed with grooves and lands was placed on the surface of the coating layer and the surface of the coating layer was irradiated with an ultraviolet ray via the stamper, thereby curing the acrylic ultraviolet curable resin. A first transparent intermediate layer having a thickness Da of 13 μm and formed with grooves and lands on the surface thereof so that the track pitch (groove pitch) was equal to 0.32 μm was formed by removing the stamper.

Then, the polycarbonate substrate formed with the L0 layer and the first transparent intermediate layer on the surface thereof was set on the sputtering apparatus and an L1 layer having a thickness of 24 nm was formed on the first transparent intermediate layer by sputtering process using a target of the mixture of ZnS to $SiO_2$ and a target of Mg so as to contain the mixture of ZnS to $SiO_2$ at the mole ratio of 50:50.

Further, a second transparent intermediate layer having a thickness Db of 10 μm was formed on the L1 layer in a similar manner to that of forming the first transparent intermediate layer on the L0 layer and an L2 layer having a thickness of 18 nm was then formed on the second transparent intermediate layer in a similar manner to that of forming the L1 layer on the first transparent intermediate layer.

Finally, the L2 layer was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 88.5 μm.

Thus, the optical recording medium sample # 2-1 was fabricated.

Further, an optical recoding medium sample # 2-2 was fabricated in the manner of the optical recording medium sample # 2-1 except that the second transparent intermediate layer was formed so as to have a thickness Db of 13 μm and a light transmission layer was formed so as to have a thickness of 87 μm.

Furthermore, an optical recoding medium sample # 2-3 was fabricated in the manner of the optical recording medium sample # 2-1 except that the second transparent intermediate layer was formed so as to have a thickness Db of 15 μm and a light transmission layer was formed so as to have a thickness of 86 μm.

Moreover, an optical recoding medium sample # 2-4 was fabricated in the manner of the optical recording medium sample # 2-1 except that the second transparent intermediate layer was formed so as to have a thickness Db of 17 μm and a light transmission layer was formed so as to have a thickness of 85 μm.

Each of the optical recording medium sample # 2-1, the optical recording medium sample # 2-2, the optical recording medium sample # 2-3 and the optical recording medium sample # 2-4 was set in a DDU1000 optical recording medium evaluation apparatus manufactured by Pulstec Industrial Co., Ltd. and a laser beam having a wavelength of 405 nm was focused onto each of the L2 layers using an objective lens whose numerical aperture was 0.85 via the light transmission layer while each sample was rotated at a linear velocity of 5.3 m/sec, thereby recording 8T signals therein.

Then, a laser beam was focused onto each of the L0 layers of the optical recording medium sample # 2-1, the optical recording medium sample # 2-2, the optical recording medium sample # 2-3 and the optical recording medium sample # 2-4 using the optical recording medium evaluation apparatus mentioned above and a signal recorded in the L0 layer was reproduced and the relationship between the level of the reproduced signal and the thickness of the second transparent intermediate layer was measured.

Figure 17:
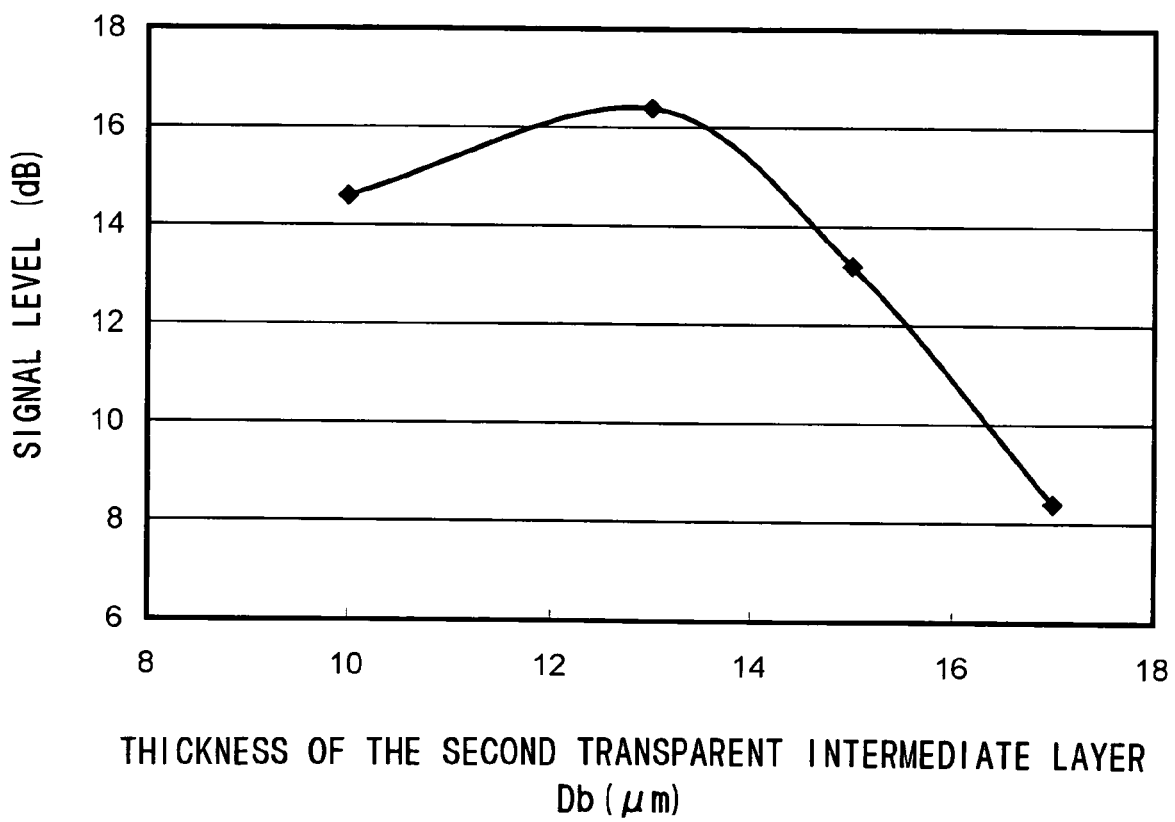
FIG. 17 is a graph showing the relationship between levels of signals reproduced from L0 layers of an optical recording medium sample #2-1, an optical recording medium sample #2-2, an optical recording medium sample #2-3 and an optical recording medium sample #2-4 and a thickness Db of a second intermediate layer measured in Working Example 2.

The results of the measurements are shown in FIG. 17.

As shown in FIG. 17, although no data were recorded in each of the L0 layers of the optical recording medium sample # 2-1, the optical recording medium sample # 2-2, the optical recording medium sample # 2-3 and the optical recording medium sample # 2-4, a signal was reproduced from each of the L0 layers. This was caused by interlayer cross-talk generated by the laser beam focused onto the L0 layer and projected onto the L2 layer.

As shown in FIG. 17, it was found that the interlayer cross-talk was highest in the optical recording medium sample # 2-2 in which the thickness Da of the first transparent intermediate layer was equal to the thickness Db of the second transparent intermediate layer and the interlayer cross-talk decreased as the difference between the thickness Da of the first transparent intermediate layer and the thickness Db of the second transparent intermediate layer became larger.

Working Example 3

Optical recording samples # 3-1 to # 3-15 were fabricated in the manner of Working Example 2 except that the first transparent intermediate layer and the second transparent intermediate layer were formed so that the total thickness thereof was 40 µm and that the thickness Db of the second transparent intermediate layer was varied in increments of 2.5 µm from 2.5 µm to 37.5 µm.

Each of the thus fabricated optical recording medium samples # 3-1 to # 3-15 was set in a DDU1000 optical recording medium evaluation apparatus manufactured by Pulstec Industrial Co., Ltd. and a laser beam having a wavelength of 405 nm was focused onto each of the L0 layers using an objective lens whose numerical aperture was 0.85 via the light transmission layer while each sample was rotated at a linear velocity of 5.3 m/sec, thereby recording 8T signals therein and the laser beam was focused onto each of the L1 layers via the light transmission layer, thereby recording 8T signals therein.

Then, a laser beam was focused onto each of the L2 layers of the optical recording medium samples # 3-1 to # 3-15 using the optical recording medium evaluation apparatus mentioned above and a signal recorded in the L2 layer was reproduced and the relationship between the level of the reproduced signal and the thickness Db of the second transparent intermediate layer was measured.

Further, each of the optical recording medium samples # 3-1 to # 3-15 was set in the optical recording medium evaluation apparatus mentioned above and a laser beam having a wavelength of 405 nm was focused onto each of the L0 layers using an objective lens whose numerical aperture was 0.85 via the light transmission layer while each sample was rotated at a linear velocity of 5.3 m/sec, thereby recording 8T signals therein and the laser beam was focused onto each of the L2 layers via the light transmission layer, thereby recording 8T signals therein.

Then, a laser beam was focused onto each of the L2 layers of the optical recording medium samples # 3-1 to # 3-15 using the optical recording medium evaluation apparatus mentioned above and a signal recorded in the L1 layer was reproduced and the relationship between the level of the reproduced signal and the thickness Db of the second transparent intermediate layer was measured.

Furthermore, each of the optical recording medium samples # 3-1 to # 3-15 was set in the optical recording medium evaluation apparatus mentioned above and a laser beam having a wavelength of 405 nm was focused onto each of the L1 layers using an objective lens whose numerical aperture was 0.85 via the light transmission layer while each sample was rotated at a linear velocity of 5.3 m/sec, thereby recording 8T signals therein and the laser beam was focused onto each of the L2 layers via the light transmission layer, thereby recording 8T signals therein.

Then, a laser beam was focused onto each of the L2 layers of the optical recording medium samples # 3-1 to # 3-15 using the optical recording medium evaluation apparatus mentioned above and a signal recorded in the L0 layer was reproduced and the relationship between the level of the reproduced signal and the thickness Db of the second transparent intermediate layer was measured.

Figure 18:
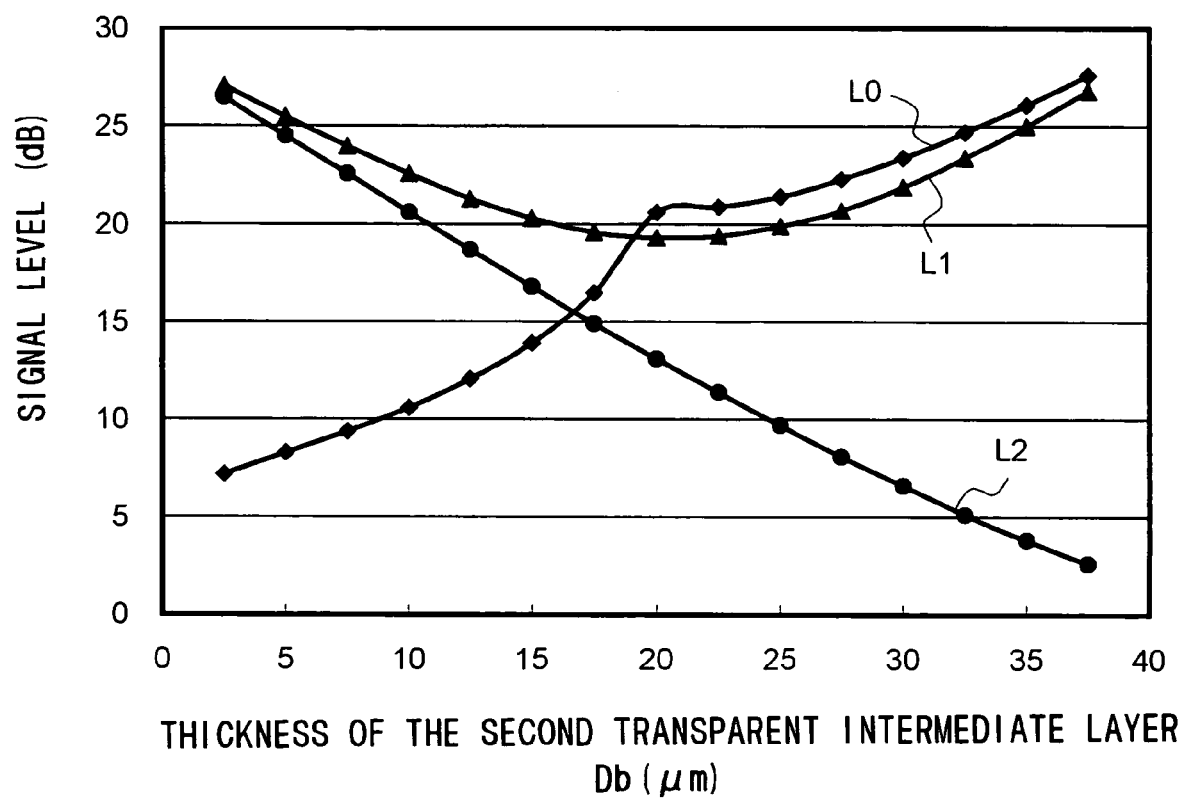
FIG. 18 is a graph showing the relationship between levels of signals reproduced from L0 layers of an optical recording medium samples #3-1 to #3-15 and a thickness Db of a second intermediate layer measured in Working Example 3.

The results of the measurement are shown in FIG. 18.

As shown in FIG. 18, in the case where an 8T signal was recorded in only the L0 layer and the L1 layer, it was found that interlayer cross-talk which arose because the laser beam focused onto the L2 layer for reproducing a signal therefrom was projected onto the L0 layer and the L1 layer and in which got mixed into the signal reproduced from the L2 layer monotonously decreased as the thickness Db of the second transparent intermediate layer increased.

Further, as shown in FIG. 18, in the case where an 8T signal was recorded in only the L0 layer and the L2 layer, it was found that interlayer cross-talk which arose because the laser beam focused onto the L1 layer for reproducing a signal therefrom was projected onto the L0 layer and the L2 layer and in which got mixed into the signal reproduced from the L1 layer decreased as the difference between the thickness Da of the first transparent intermediate layer and the thickness Db of the second transparent intermediate layer decreased but the interlayer cross-talk was high as a whole.

To the contrary, as shown in FIG. 18, in the case where an 8T signal was recorded in only the L1 layer and the L2 layer, it was found that interlayer cross-talk which arose because the laser beam focused onto the L0 layer for reproducing a signal therefrom was projected onto the L1 layer and the L1 layer and in which got mixed into the signal reproduced from the L0 layer decreased as the thickness of the second transparent intermediate layer decreased but the dependency of the interlayer cross-talk on the thickness of the second transparent intermediate layer was higher when the thickness of the second transparent intermediate layer was smaller than that of the first transparent intermediate layer.

It is reasonable to conclude that the dependency of the interlayer cross-talk on the thickness of the second transparent intermediate layer was lower when the thickness of the second transparent intermediate layer was larger than that of the first transparent intermediate layer because as the thickness of the second transparent intermediate layer decreased, the interlayer cross-talk which arose because the laser beam was projected onto the L1 layer and which got mixed into the signal reproduced from the L0 layer became insignificant but the difference between the thickness of the first transparent intermediate layer and that of the second transparent intermediate layer became smaller, whereby the interlayer cross-talk which arose because the laser beam was projected onto the L2 layer and which got mixed into the signal reproduced from the L0 layer became significant. On the other hand, it is reasonable to conclude that the dependency of the interlayer cross-talk on the thickness of the second transparent intermediate layer was higher when the thickness of the second transparent intermediate layer was smaller than that of the first transparent intermediate layer because as the thickness of the second transparent intermediate layer decreased, not only interlayer cross-talk which arose because the laser beam was projected onto the L1 layer and which got mixed into the signal reproduced from the L0 layer became insignificant but also the difference between the thickness of the first transparent intermediate layer and that of the second transparent intermediate layer became larger, whereby interlayer cross-talk which arose because the laser beam was projected onto the L2 layer and in which got mixed into the signal reproduced from the L0 layer became insignificant.

Working Example 4

An optical recording sample # 4 was fabricated in the manner of the optical recording medium sample # 1 except that each of the first transparent intermediate layer, the second transparent intermediate layer and the third transparent intermediate layer was formed so as to have a thickness of 20 μm.

The thus fabricated optical recording medium sample # 4 was set in a DDU1000 optical recording medium evaluation apparatus manufactured by Pulstec Industrial Co., Ltd. and a laser beam having a wavelength of 405 nm was sequentially focused onto the L0 layer, the L1 layer and the L2 layer using an objective lens whose numerical aperture was 0.85 via the light transmission layer while the optical recording medium sample # 4 was rotated at a linear velocity of 5.3 m/sec, thereby recording 8T signals therein.

Then, the laser beam was focused using the optical recording medium evaluation apparatus mentioned above onto the L3 layer of the optical recording sample # 4 in which no signal was recorded and a signal was reproduced. The level of the thus reproduced signal was 13.1 dB. Since an 8T signal was not recorded in the L3 layer, this was caused by the influence of interlayer cross-talk and the interlayer cross-talk in the L3 layer was thus 13.1 dB.

Further, the optical recording medium sample # 4 was set in the optical recording medium evaluation apparatus mentioned above and a laser beam having a wavelength of 405 nm was sequentially focused onto another track of the L0 layer, the L1 layer and the L3 layer via the light transmission layer, thereby recording 8T signals therein.

Then, the laser beam was focused using the optical recording medium evaluation apparatus mentioned above onto the L2 layer of the optical recording sample # 4 in which no signal was recorded and a signal was reproduced. The level of the thus reproduced signal was 19.8 dB. Since an 8T signal was not recorded in the L2 layer, this was caused by the influence of interlayer cross-talk and the interlayer cross-talk in the L2 layer was thus 19.8 dB.

Furthermore, the optical recording medium sample # 4 was set in the optical recording medium evaluation apparatus mentioned above and a laser beam having a wavelength of 405 nm was sequentially focused onto the other track of the L0 layer, the L2 layer and the L3 layer via the light transmission layer, thereby recording 8T signals therein.

Then, the laser beam was focused using the optical recording medium evaluation apparatus mentioned above onto the L1 layer of the optical recording sample # 4 in which no signal was recorded and a signal was reproduced. The level of the thus reproduced signal was 23.3 dB. Since an 8T signal was not recorded in the L1 layer, this was caused by the influence of interlayer cross-talk and the interlayer cross-talk in the L1 layer was thus 23.3 dB.

Moreover, the optical recording medium sample # 4 was set in the optical recording medium evaluation apparatus mentioned above and a laser beam having a wavelength of 405 nm was sequentially focused onto the other track of the L1 layer, the L2 layer and the L3 layer via the light transmission layer, thereby recording 8T signals therein.

Then, the laser beam was focused using the optical recording medium evaluation apparatus mentioned above onto the L0 layer of the optical recording sample # 4 in which no signal was recorded and a signal was reproduced. The level of the thus reproduced signal was 20.6 dB. Since an 8T signal was not recorded in the L0 layer, this was caused by the influence of interlayer cross-talk and the interlayer cross-talk in the L0 layer was thus 20.6 dB.

Therefore, in the optical recording medium sample # 4 fabricated so that the thickness Da of the first transparent intermediate layer, the thickness Db of the second transparent intermediate layer and the thickness Dc of the third transparent intermediate layer were equal to 20 μm, the influence of interlayer cross-talk was maximum in the L1 layer and the maximum level of the interlayer cross-talk was 23.3 dB.

Further, optical recording medium samples # 4-1 to # 4-m were fabricated in the manner of the optical recording medium sample # 1 except that a first transparent intermediate layer, a second transparent intermediate layer and a third transparent intermediate layer were formed so that the thickness Da of the first transparent intermediate layer, the thickness Db of the second transparent intermediate layer and the thickness Dc of the third transparent intermediate layer were varied, while the total thickness thereof was kept to be 60 μm.

The thus fabricated optical recording medium samples # 4-1 to # 4-m were sequentially set in the optical recording medium evaluation apparatus mentioned above and a laser beam having a wavelength of 405 nm was sequentially focused onto the L0 layer, the L1 layer and the L2 layer of each of the optical recording medium samples # 4-1 to # 4-m using an objective lens whose numerical aperture was 0.85 via the light transmission layer while each of the optical recording medium samples # 4-1 to # 4-m were rotated at a linear velocity of 5.3 m/sec, thereby recording 8T signals therein.

Then, the optical recording medium samples # 4-1 to # 4-m were sequentially set in the optical recording medium evaluation apparatus mentioned above and the laser beam was focused onto the L3 layer of each of the optical recording samples # 4-1 to # 4-m in which no signal was recorded and a signal was reproduced. Since an 8T signal was not recorded in the L3 layer of each of the optical recording medium samples # 4-1 to # 4-*m*, the thus reproduced signal was caused by the influence of interlayer cross-talk.

Further, the optical recording medium samples # 4-1 to # 4-*m* were sequentially set in the optical recording medium evaluation apparatus mentioned above and similarly to the above, a laser beam having a wavelength of 405 nm was sequentially focused onto the L0 layer, the L1 layer and the L3 layer of each of the optical recording medium samples # 4-1 to # 4-*m* via the light transmission layer, thereby recording 8T signals therein.

Then, the optical recording medium samples # 4-1 to # 4-*m* were sequentially set in the optical recording medium evaluation apparatus mentioned above and the laser beam was focused onto the L2 layer of each of the optical recording samples # 4-1 to # 4-*m* in which no signal was recorded and a signal was reproduced. Since an 8T signal was not recorded in the L2 layer of each of the optical recording medium samples # 4-1 to # 4-*m*, the thus reproduced signal was caused by the influence of interlayer cross-talk.

Furthermore, the optical recording medium samples # 4-1 to # 4-*m* were sequentially set in the optical recording medium evaluation apparatus mentioned above and similarly to the above, a laser beam having a wavelength of 405 nm was sequentially focused onto the L0 layer, the L2 layer and the L3 layer of each of the optical recording medium samples # 4-1 to # 4-*m* via the light transmission layer, thereby recording 8T signals therein.

Then, the optical recording medium samples # 4-1 to # 4-*m* were sequentially set in the optical recording medium evaluation apparatus mentioned above and the laser beam was focused onto the L1 layer of each of the optical recording samples # 4-1 to # 4-*m* in which no signal was recorded and a signal was reproduced. Since an 8T signal was not recorded in the L1 layer of each of the optical recording medium samples # 4-1 to # 4-*m*, the thus reproduced signal was caused by the influence of interlayer cross-talk.

Moreover, the optical recording medium samples # 4-1 to # 4-*m* were sequentially set in the optical recording medium evaluation apparatus mentioned above and similarly to the above, a laser beam having a wavelength of 405 nm was sequentially focused onto the L1 layer, the L2 layer and the L3 layer of each of the optical recording medium samples # 4-1 to # 4-*m* via the light transmission layer, thereby recording 8T signals therein.

Then, the optical recording medium samples # 4-1 to # 4-*m* were sequentially set in the optical recording medium evaluation apparatus mentioned above and the laser beam was focused onto the L0 layer of each of the optical recording samples # 4-1 to # 4-*m* in which no signal was recorded and a signal was reproduced. Since an 8T signal was not recorded in the L0 layer of each of the optical recording medium samples # 4-1 to # 4-*m*, the thus reproduced signal was caused by the influence of interlayer cross-talk.

Each of the thus obtained maximum levels of interlayer cross-talk in signals reproduced from the optical recording medium sample # 4-1 to # 4-*m* was subtracted from the maximum level of interlayer cross-talk in the signals reproduced from the optical recording medium sample # 4, namely, 23.3 dB and how the maximum levels of interlayer cross-talk were changed by varying the thickness Da of the first transparent intermediate layer, the thickness Db of the second transparent intermediate layer and the thickness Dc of the third transparent intermediate layer was measured.

Figure 19:
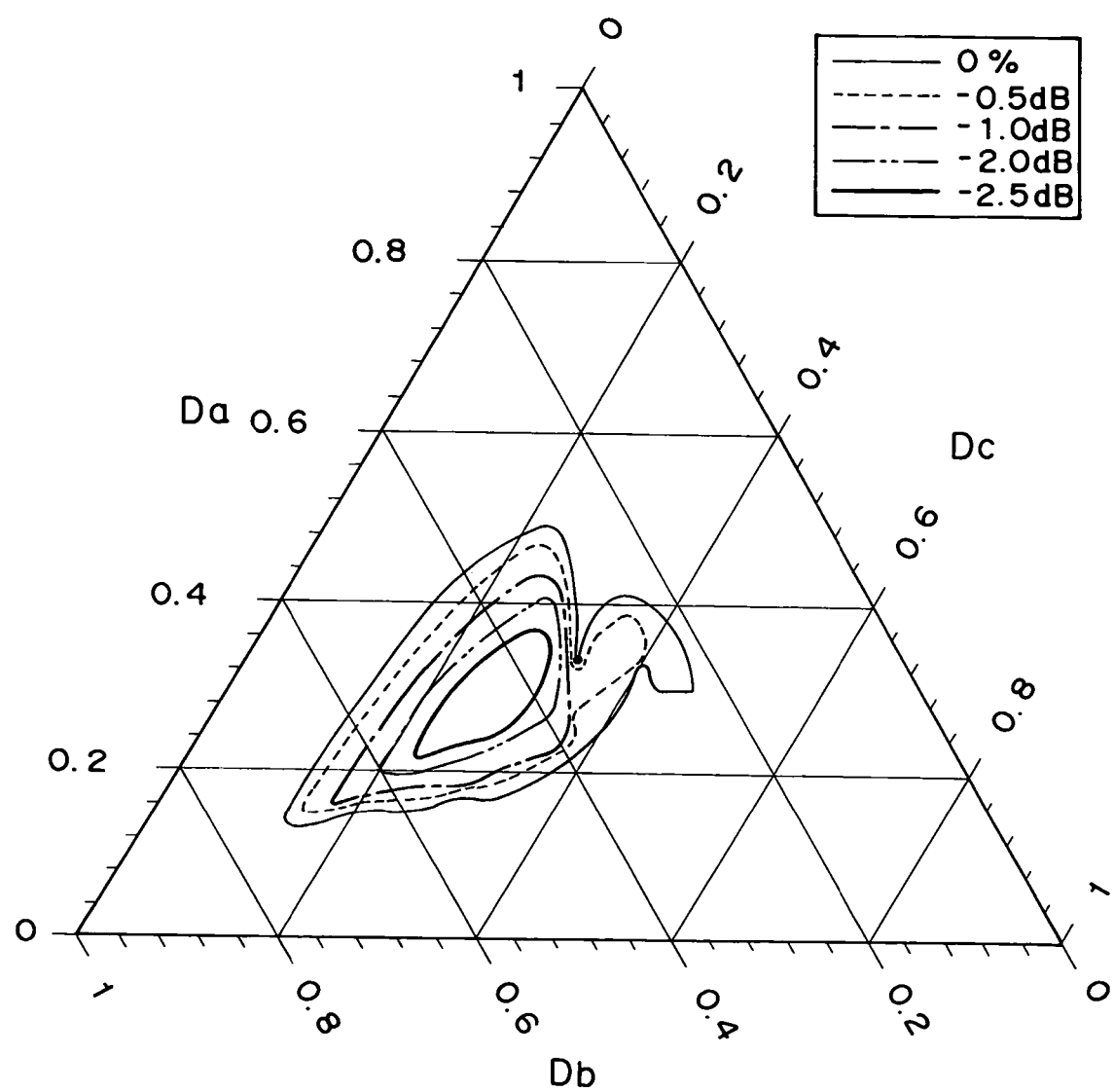
FIG. 19 is a graph showing how the maximum interlayer cross-talk varied with thickness Da of a first intermediate layer, a thickness Db of a second intermediate layer and a thickness Dc of a third intermediate layer in Working Example 4.

The results of the measurement are shown in FIG. 19.

As shown in FIG. 19, it was found that in the case where the thickness Da of the first transparent intermediate layer was 20% to 40% of the total thickness (Da+Db+Dc) of the first transparent intermediate layer, the second transparent intermediate layer and the third transparent intermediate layer, the thickness Db of the second transparent intermediate layer was 35% to 60% of the total thickness (Da+Db+Dc) of the first transparent intermediate layer, the second transparent intermediate layer and the third transparent intermediate layer and the thickness Dc of the third transparent intermediate layer was 20% to 40% of the total thickness (Da+Db+Dc) of the first transparent intermediate layer, the second transparent intermediate layer and the third transparent intermediate layer, the maximum level of the interlayer cross-talk was greatly decreased and that in the case where the thickness Da of the first transparent intermediate layer was 22% to 36% of the total thickness (Da+Db+Dc) of the first transparent intermediate layer, the second transparent intermediate layer and the third transparent intermediate layer, the thickness Db of the second transparent intermediate layer was 36% to 55% of the total thickness (Da+Db+Dc) of the first transparent intermediate layer, the second transparent intermediate layer and the third transparent intermediate layer and the thickness Dc of the third transparent intermediate layer was 22% to 32% of the total thickness (Da+Db+Dc) of the first transparent intermediate layer, the second transparent intermediate layer and the third transparent intermediate layer, the maximum level of the interlayer cross-talk was particularly greatly decreased.

Therefore, it was found that for suppressing the maximum level of the interlayer cross-talk it was preferable to form the first transparent intermediate layer, the second transparent intermediate layer and the third transparent intermediate layer so that the thickness Da of the first transparent intermediate layer was smaller than the thickness Db of the second transparent intermediate layer and that the thickness Dc of the third transparent intermediate layer was smaller than the thickness Db of the second transparent intermediate layer.

Further, it was found from FIG. 19 that the maximum level of the interlayer cross-talk could be suppressed to be much smaller by forming the first transparent intermediate layer, the second transparent intermediate layer and the third transparent intermediate layer so that the thickness Dc of the third transparent intermediate layer was smaller than the thickness Da of the frist transparent intermediate layer.

The present invention has thus been shown and described with reference to specific embodiments and working examples. However, it should be noted that the present invention is in no way limited to the details of the described arrangements but changes and modifications may be made without departing from the scope of the appended claims.

For example, in the above described embodiments, although each of the L0 layer 20, the L1 layer 30, the L2 layer 40, the L3 layer 50 and the L4 layer 60 is constituted as a write-once type information recording layer that enable writing but not rewriting of data, the L0 layer 20, each of the L1 layer 30, the L2 layer 40, the L3 layer 50 and the L4 layer 60 may be constituted as a data rewritable type information recording layer or an information recording layer adapted to enable only data reading. Further, the L0 layer 20, each of the L1 layer 30, the L2 layer 40, the L3 layer 50 and the L4 layer 60 may be constituted as the same type information recording layers but a part of them may be constituted as different type information recording layers.

Furthermore, in the above described embodiments, although the optical recording medium 10, 100, 150 includes three to five information recording layers, it is not absolutely necessary for an optical recording medium to include three to five information recording layers but an optical recording medium may include six or more information recording layers.

Moreover, in the above described embodiments, although the optical recording medium 10, 100, 150 includes the light transmission layer 19 and is constituted so that a laser beam L is projected onto the information recording layers via the light transmission layer 19, the present invention is not limited to an optical recording medium having such a configuration and the optical recording medium may include three or more information recording layers between a substrate formed of a light transmittable material and a protective layer and be constituted so that a laser beam L is projected onto the information recording layers via the substrate.

According to the present invention, it is possible to provide an optical recording medium which includes three or more information recording layers and reduces interlayer cross-talk.

The invention claimed is:

1. An optical recording medium comprising a substrate, a protective layer, four or more information recording layers, a light incidence plane being constituted by the surface of either the substrate or the protective layer, the optical recording medium further comprising a first transparent intermediate layer formed between a first information recording layer farthest from the light incidence plane and a second information recording layer located on the side of the light incidence plane with respect to the first information recording layer, a second transparent intermediate layer formed between the second information recording layer and a third information recording layer located on the side of the light incidence plane with respect to the second information recording layer, and a third transparent intermediate layer formed between the third information recording layer and a fourth information recoding layer located on the side of the light incidence plane with respect to the third information recording layer wherein the first transparent intermediate layer, the second transparent intermediate layer, and the third transparent intermediate layer are formed so that a thickness Da of the first transparent intermediate layer is 20% to 40% of a total thickness (Da+Db+Dc) of the first transparent intermediate layer, the second transparent intermediate layer, and the third transparent intermediate layer, a thickness Db of the second transparent intermediate layer is 35% to 60% of the total thickness (Da+Db+Dc) of the first transparent intermediate layer, the second transparent intermediate layer and the third transparent intermediate layer, and a thickness Dc of the third transparent intermediate layer is 20% to 40% of the total thickness (Da+Db+Dc) of the first transparent intermediate layer, the second transparent intermediate layer and the third transparent intermediate layer.

2. An optical recording medium in accordance with claim 1, wherein the first transparent intermediate layer, the second transparent intermediate layer and the third transparent intermediate layer are formed so that the thickness of the first transparent intermediate layer is 22% to 36% of the total thickness of the first transparent intermediate layer, the second transparent intermediate layer and the third transparent intermediate layer, the thickness of the second transparent intermediate layer is 36% to 55% of the total thickness of the first transparent intermediate layer, the second transparent intermediate layer and the third transparent intermediate layer, and the thickness of the third transparent intermediate layer is 22% to 32% of the total thickness of the first transparent intermediate layer, the second transparent intermediate layer and the third transparent intermediate layer.

3. An optical recording medium comprising a substrate, a protective layer, four or more information recording layers, a light incidence plane being constituted by the surface of either the substrate or the protective layer, the optical recording medium further comprising a first transparent intermediate layer formed between a first information recording layer farthest from the light incidence plane and a second information recording layer located on the side of the light incidence plane with respect to the first information recording layer, a second transparent intermediate layer formed between the second information recording layer and a third information recording layer located on the side of the light incidence plane with respect to the second information recording layer, and a third transparent intermediate layer formed between the third information recording layer and a fourth information recoding layer located on the side of the light incidence plane with respect to the third information recording layer wherein the first transparent intermediate layer, the second transparent intermediate layer, and the third transparent intermediate layer are formed so that a thickness Da of the first transparent intermediate layer is 20% to 40% of a total thickness (Da+Db+Dc) of the first transparent intermediate layer, the second transparent intermediate layer, and the third transparent intermediate layer, a thickness Db of the second transparent intermediate layer is 35% to 60% of the total thickness (Da+Db+Dc) of the first transparent intermediate layer, the second transparent intermediate layer, and the third transparent intermediate layer, and a thickness Dc of the third transparent intermediate layer is 20% to 40% of the total thickness (Da+Db+Dc) of the first transparent intermediate layer, the second transparent intermediate layer, and the third transparent intermediate layer, and wherein the first transparent intermediate layer, the second transparent intermediate layer, and the third transparent intermediate layer are further formed so that the thickness of the first transparent intermediate layer is larger than that of the third transparent intermediate layer.

4. An optical recording medium in accordance with claim 3, wherein the first transparent intermediate layer, the second transparent intermediate layer and the third transparent intermediate layer are formed so that the thickness of the first transparent intermediate layer is 22% to 36% of the total thickness of the first transparent intermediate layer, the second transparent intermediate layer and the third transparent intermediate layer, the thickness of the second transparent intermediate layer is 36% to 55% of the total thickness of the first transparent intermediate layer, the second transparent intermediate layer and the third transparent intermediate layer, and the thickness of the third transparent intermediate layer is 22% to 32% of the total thickness of the first transparent intermediate layer, the second transparent intermediate layer and the third transparent intermediate layer.

* * * * *